(12) United States Patent
Slater et al.

(10) Patent No.: US 11,632,594 B2
(45) Date of Patent: *Apr. 18, 2023

(54) SYSTEMS AND METHODS FOR MANAGING CONTENT DISTRIBUTION TO AN IN-TRANSIT MEDIA SYSTEM

(71) Applicant: Viasat, Inc., Carlsbad, CA (US)

(72) Inventors: Joshua G. Slater, Ladera Ranch, CA (US); Robert G. Crockett, Jr., San Marco, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,542

(22) Filed: Jun. 14, 2021

(65) Prior Publication Data
US 2021/0306717 A1 Sep. 30, 2021

Related U.S. Application Data

(63) Continuation of application No. 16/684,815, filed on Nov. 15, 2019, now Pat. No. 11,064,263, which is a
(Continued)

(51) Int. Cl.
*H04N 21/647* (2011.01)
*H04N 21/238* (2011.01)
*H04N 21/414* (2011.01)
*H04N 21/44* (2011.01)
*H04N 21/442* (2011.01)
(Continued)

(52) U.S. Cl.
CPC ... *H04N 21/64769* (2013.01); *H04N 21/2146* (2013.01); *H04N 21/238* (2013.01); *H04N 21/23605* (2013.01); *H04N 21/23805* (2013.01); *H04N 21/2401* (2013.01); *H04N 21/2404* (2013.01); *H04N 21/41422* (2013.01); *H04N 21/437* (2013.01); *H04N 21/442* (2013.01); *H04N 21/44004* (2013.01); *H04N 21/6143* (2013.01); *H04N 21/6193* (2013.01); *H04N 21/64738* (2013.01); *H04N 21/64776* (2013.01)

(58) Field of Classification Search
CPC ......... H04N 21/2146; H04N 21/23605; H04N 21/238; H04N 21/23805; H04N 21/2401; H04N 21/2404; H04N 21/41422; H04N 21/437; H04N 21/44004; H04N 21/442; H04N 21/6143; H04N 21/6193; H04N 21/64738; H04N 21/64769; H04N 21/64776
See application file for complete search history.

(56) References Cited

U.S. PATENT DOCUMENTS 6,574,338 B1 6/2003 Sachdev
8,326,282 B2 12/2012 Margis
(Continued)

FOREIGN PATENT DOCUMENTS

WO WO 2017/020017 A1 2/2017

*Primary Examiner* — Rong Le
(74) *Attorney, Agent, or Firm* — Holland & Hart LLP

(57) ABSTRACT

Systems and methods for dynamically multiplexing requested linear media channels and network data on forward link traffic streams of a communication link to a craft media delivery system are provided. Furthermore, systems and methods for receiving dynamically multiplexed requested linear media channels and network data on forward link traffic streams of a communication link by a craft media delivery system are also provided.

26 Claims, 13 Drawing Sheets

Related U.S. Application Data continuation of application No. 15/747,650, filed as application No. PCT/US2016/044899 on Jul. 29, 2016, now Pat. No. 10,499,114.

(60) Provisional application No. 62/198,573, filed on Jul. 29, 2015.

(51) Int. Cl.
| | | |
|---|---|---|
| *H04N 21/24* | (2011.01) | |
| *H04N 21/61* | (2011.01) | |
| *H04N 21/236* | (2011.01) | |
| *H04N 21/214* | (2011.01) | |
| *H04N 21/437* | (2011.01) | |

(56) References Cited

U.S. PATENT DOCUMENTS

| | | |
|---|---|---|
| 2003/0067872 A1 | 4/2003 | Harrell et al. |
| 2005/0152397 A1 | 7/2005 | Bai et al. |
| 2006/0040612 A1 | 2/2006 | Min |
| 2007/0133405 A1 | 6/2007 | Bowra et al. |
| 2010/0180299 A1 | 7/2010 | Girard et al. |
| 2011/0116373 A1 | 5/2011 | Lauer |
| 2011/0265128 A1 | 10/2011 | Bengeult et al. |
| 2013/0163430 A1 | 6/2013 | Gell et al. |
| 2014/0282727 A1 | 9/2014 | Keen et al. |
| 2014/0282747 A1 | 9/2014 | Richman et al. |

SYSTEMS AND METHODS FOR MANAGING CONTENT DISTRIBUTION TO AN IN-TRANSIT MEDIA SYSTEM

CROSS-REFERENCE TO RELATED APPLICATIONS

The present application for patent is a Continuation of U.S. patent application Ser. No. 16/684,815 filed Nov. 15, 2019, which is a continuation of U.S. patent application Ser. No. 15/747,650, filed Jan. 25, 2018, which is a 371 of PCT Application No. PCT/US16/44899, filed Jul. 29, 2016, which claims the benefit of U.S. Provisional Application No. 62/198,573, filed Jul. 29, 2015, which is incorporated by reference herein in its entirety.

BACKGROUND

An aircraft may include a two-way communication system to facilitate communication with a communications satellite to provide network access (e.g., to the Internet) to passengers. The aircraft may also include an in-flight entertainment system that receives one-way direct broadcast satellite (DBS) programming signals from a broadcast satellite to provide television service to passengers. However, having communication and television services provided by separate systems is costly and complex.

SUMMARY

A method is provided. The method includes providing communication service to a craft via a communication link, the craft including a media delivery system to receive requests for a group of linear media channels from among a plurality of linear media channels offered within the craft, and to buffer and manage distribution of the group of requested linear media channels received via the communication link according to the requests. The method includes receiving, for a time period, linear media channel packets of the requested linear media channels and network traffic packets requested by client devices within the craft, the linear media channel packets associated with a linear media channel demand and the network traffic packets associated with a network traffic demand. The method includes obtaining, for the time period, an indication of whether the communication link is congested or uncongested. The method includes, in response to the indication that the communication link is uncongested, scheduling transmission of the linear media channel packets and the network traffic packets to the craft via the communication link according to the linear media channel demand and the network traffic demand respectively. The method includes, in response to the indication that the communication link is congested, determining an available information rate for transmitting the linear media channel packets based on a difference between a supported information rate of the communication link and the network traffic demand, and scheduling transmission of the linear media channel packets and the network traffic packets to the craft via the communication link according to the determined available information rate and the network traffic demand respectively.

Another method is provided. The method includes establishing, at a network access unit located on a craft, a plurality of connections with a plurality of client devices on the craft. The method includes establishing communication between a media delivery system located on the craft and the network access unit. The method includes receiving, at the network access unit, requests for linear media channel segments of a group of linear media channels from among a plurality of linear media channels offered within the craft by the media delivery system in response to requests originating on the craft for the linear media channels, and requests for network data other than a linear media channel originating from at least one of the plurality of client devices on the craft. The method includes transmitting, via a communication link, a return link signal comprising the requests for the linear media channel segments and the requests for the network data. The method includes receiving, for a time period, a multiplexed forward link signal comprising linear media channel packets of the requested linear media channel segments and network traffic packets of the requested network data. The method includes demultiplexing the forward link signal into the linear media channel packets and the network traffic packets. The method includes providing the linear media channel packets to the media delivery system for buffering and distribution according to the requests originating on the craft for the group of linear media channels. The method includes associating each respective network traffic packet of the network traffic packets with a respective client device of the plurality of client devices on the craft. The method includes communicating each respective network traffic packet of the network traffic packets to the respective client device associated with the respective network traffic packet via at least one of the plurality of connections.

An apparatus is provided. The apparatus includes a forward link traffic shaper configured to provide communication service to a craft via a communication link, the craft including a media delivery system to receive requests for a group of linear media channels from among a plurality of linear media channels offered within the craft, and to buffer and manage distribution of the group of requested linear media channels received via the communication link according to the requests. The forward link traffic shaper is configured to receive, for a time period, linear media channel packets of the requested linear media channels from a linear media channel queue and network traffic packets from a network traffic queue, each requested by client devices within the craft, the linear media channel packets associated with a linear media channel demand and the network traffic packets associated with a network traffic demand. The forward link traffic shaper is configured to obtain, for the time period, an indication of whether the communication link is congested or uncongested. The forward link traffic shaper is configured to, in response to the indication that the communication link is uncongested, schedule transmission of the linear media channel packets and the network traffic packets to the craft via the communication link according to the linear media channel demand and the network traffic demand respectively. The forward link traffic shaper is configured to, in response to the indication that the communication link is congested, determine an available information rate for transmitting the linear media channel packets based on a difference between a supported information rate of the communication link and the network traffic demand, and schedule transmission of the linear media channel packets and the network traffic packets to the craft via the communication link according to the determined available information rate and the network traffic demand respectively.

An apparatus for location on a craft is provided. The apparatus includes a media delivery system comprising a media buffer, and a network access unit in communication with the media delivery system, the network access unit. The network access unit is configured to establish a plurality of connections with a plurality of client devices on the craft. The network access unit is configured to establish communication with the media delivery system. The network access unit is configured to receive requests for linear media channel segments of a group of linear media channels from among a plurality of linear media channels offered within the craft by the media delivery system in response to requests originating on the craft for the linear media channels. The network access unit is configured to receive requests for network data other than a linear media channel originating from at least one of the plurality of client devices on the craft. The network access unit is configured to transmit, via a communication link, a return link signal comprising the requests for the linear media channel segments and the requests for the network data. The network access unit is configured to receive, for a time period, a multiplexed forward link signal comprising linear media channel packets of the requested linear media channel segments and network traffic packets of the requested network data. The network access unit is configured to demultiplex the forward link signal into the linear media channel packets and the network traffic packets. The network access unit is configured to provide the linear media channel packets to the media delivery system for buffering and distribution according to the requests originating on the craft for the group of linear media channels. The network access unit is configured to associate each respective network traffic packet of the network traffic packets with a respective client device of the plurality of client devices on the craft. The network access unit is configured to communicate each respective network traffic packet of the network traffic packets to the respective client device associated with the respective network traffic packet via at least one of the plurality of connections.

BRIEF DESCRIPTION OF THE DRAWINGS

The present disclosure is described in conjunction with the appended figures.

DETAILED DESCRIPTION

Figure 1:
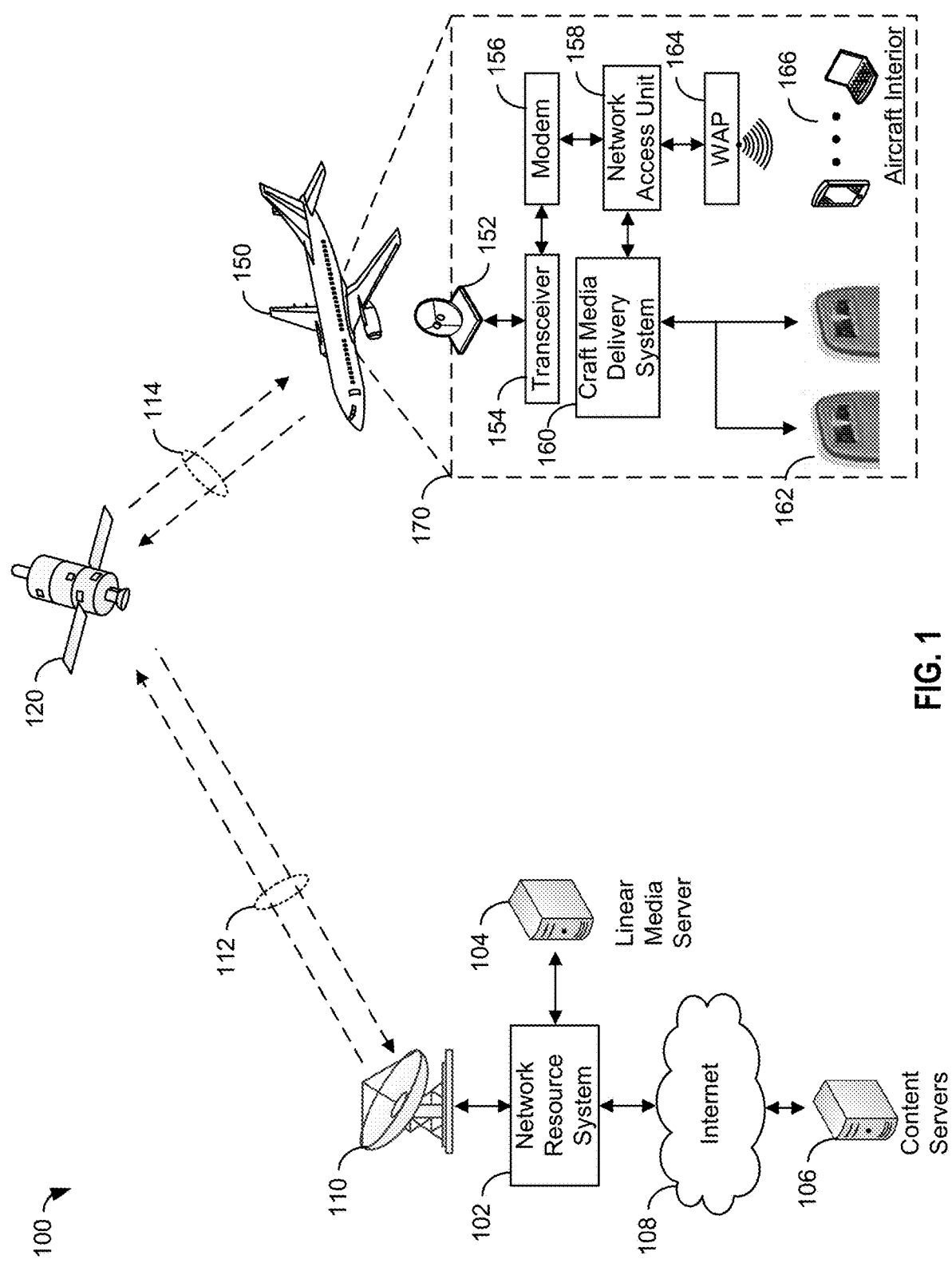
FIG. 1 depicts a simplified diagram of a satellite communication system, in accordance with some embodiments.

Systems and methods are described herein for multiplexing requested linear media channels (e.g., video channels) and other requested network data (e.g., browsing data) on a forward link traffic stream of a common communication link to a craft. The requested linear media channels are a group of one or more channels, from among multiple available channels offered for selection, which have been requested for consumption by passengers. The network data may for example be web browsing, text messaging, email messaging, and other streaming data requested by passengers. By providing the requested linear media channels and network data over the same communication link, some or all of the same communication system components (e.g., antenna system, transceiver, router, modem, access point(s), etc.) may be used to provide both communication and television services to passengers, thereby reducing cost, complexity, weight, power demands, etc. as compared to having multiple, single-use systems on the craft.

In some embodiments, the requested linear media channels and the requested network data are dynamically multiplexed on the forward link traffic stream. Demand profiles of linear media channels may differ from demand profiles for network data (e.g., web browsing data). For example, a linear media channel may have a relatively steady demand profile, while web browsing may have irregular periods of relatively large initial peak of demand followed by a period of relatively little or no demand. As described in more detail below, a network resource system may actively shape the forward link traffic stream on the common communication link to prioritize network data over the requested linear media channels, in a manner that still provides uninterrupted consumption of the linear media channels by passengers. In particular, a craft media delivery system on the craft can include local storage that nominally buffers an amount of the requested linear media channels sufficient to handle delayed receipt of the linear media channel packets from time to time. For example, the amount of the requested linear media channels nominally buffered by the local storage on a per-requested-channel basis may be substantially equivalent to an amount consumed (i.e., the playback rate) by a requesting client device in 30-60 seconds, although any other appropriate amount is also contemplated.

The network resource system can take the current size of the buffer into consideration when shaping the forward link traffic stream. For example, during a period of congestion that is shorter than the time it would take to deplete the buffer, the network resource system can prioritize the network traffic packets and delay some or all the linear media channel packets. In such a case, the streaming of the requested linear media channels to the passengers continues uninterrupted by drawing down the size of the buffer. During a subsequent uncongested period of time, the delayed linear media channel packets can then be transmitted to the craft media delivery system to refill the buffer, along with any newly requested network data and/or additional linear media channel packets. In doing so, dynamic multiplexing of the common resources of a communication link servicing the craft may increase the resources available to the craft on a statistical basis. As used herein, a communication link is considered "congested" when a committed amount of data to be communicated via the communication link over a predetermined period of time (i.e., "demand") is greater than or equal to the amount of data the communication link is allotted to communicate or capable of communicating over that predetermined period of time (i.e., "supply"), or some offset thereof. For example, a communication link can be considered "congested" when the committed amount of data reaches a certain level (e.g., 85%) of the amount of data it is allotted to communicate or capable of communicating over a predetermined period of time. In some embodiments, portions of a communication link's capacity may be allocated to particular purposes, so that congestion can be further defined in context of demand versus supply of a particular type of traffic and/or a particular type of terminal. According to such definitions, a communication link can be considered as having available (or excess) capacity when it is uncongested.

In some embodiments, only the linear media channels that have been requested by a passenger on the craft (or other craft, or other terminal sharing the same communication link) are scheduled for transmission over the communication link. This can provide more efficient utilization of the communication link for delivery of television service to the craft, as compared to providing all the available linear media channels regardless of whether a channel is being watched.

In some embodiments, the craft media delivery system checks received packets of the requested linear media channels for errors and re-requests packets if needed. In doing so, the craft media delivery system can provide reliable television service to passengers, in contrast to one-way direct broadcast television having no guarantee of delivery. The craft media delivery system may accomplish such an error check through either positive or negative logic. That is, the network resource system may expect acknowledgement of receipt of individual packets, and retransmit those packets that are not acknowledged. Alternatively, the network resource system may only retransmit packets upon receipt of an explicit "non-acknowledgement" indication from the craft media delivery system, that is, an explicit message from the craft indicating a packet was not received. In the latter case, the craft may have a priori knowledge or expectation of what was supposed to received, e.g., via a high level bit map.

Several embodiments will be described below in connection with the following figures.

FIG. 1 depicts a simplified diagram of a satellite communication system 100, in accordance with some embodiments. Many other configurations having more or fewer components than the satellite communication system 100 of FIG. 1 are possible. Satellite communication system 100 includes a satellite 120 in bidirectional communication with a ground terminal 110 via a feeder communication link 112. In some embodiments, ground terminal 110 may be known as an access node or a gateway. Satellite 120 is also in bidirectional communication with a craft 150 via a service communication link 114. Accordingly, feeder communication link 112 and service communication link 114 may enable communication between craft 150 and ground terminal 110 via satellite 120 while craft 150 is stationary or in motion. Although only one ground terminal 110 is shown to avoid over complication of the drawing, the satellite communication system 100 may include many more ground terminals.

Ground terminal 110 is in communication with a network resource system 102. Networks or communication links between ground terminal 110 and network resource system 102 may be any type of network and may include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein.

In some embodiments, network resource system 102 is in communication with a linear media server 104. Although FIG. 1 shows only one linear media server 104, the present application is not so limited and a plurality of linear media servers are also contemplated. Networks or communication links between network resource system 102 and linear media server 104 may be any type of network and may include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein.

Linear media server 104 may include one or more media servers, media storage devices, etc., as well as other data stores. The linear media server 104 may for example be a cable television headend, satellite television headend, network bitstream of linear content, etc. Linear media server 104 may be configured to provide linear media channels to network resource system 102. Linear media data generally refers to any stream of content that is scheduled for delivery at a certain time (e.g., a television show run at a set time, a live event, a televised sporting event, etc.). For example, various broadcast television channel offerings may be available from linear media server 104 and may be referred to as linear media channel data. Thus, when a user decides to select, for example, a "channel" carrying linear media content, the user effectively elects to consume whatever scheduled media is playing on that channel at that time; as opposed to directly selecting the media content item itself and initiating the media content item to begin playing at the beginning.

In some embodiments, network resource system 102 is also in communication with content server 106 via Internet 108 and/or other type of network. Although FIG. 1 shows only one content server 106, the present application is not so limited and a plurality of content servers are also contemplated. Content server 106 may include one or more servers, storage devices, etc., as well as other data stores. Content server 106 may be configured to provide network data to network resource system 102 in response to requests originating from passengers on craft 150 (discussed in more detail below). Network data generally refers to requested on-demand content, for example Internet page content, YouTube or other audio and/or video content that is available for viewing from a user-selectable part of the content on-demand, text messaging, email messaging, other streaming data, and web browsing by the passengers on craft 150.

As will be described in more detail below, network resource system 102 may be configured to schedule transmission of packets of the linear media channel data received from linear media server 104 and packets of the network content received from content server 106 to craft 150 via ground terminal 110, feeder communication link 112, satellite 120 and service communication link 114 based at least in part on a congestion status of one or both of feeder communication link 112 and service communication link 114. The functions of the network resource system 102 can be implemented in hardware, instructions embodied in a memory and formatted to be executed by one or more general or application-specific processors, firmware, and any combination thereof.

While a single craft 150 (in this example, an airplane) is shown in communication via a single satellite 120 in FIG. 1, the techniques described herein can be applied in many other communication environments. For example, crafts capable of participating in the satellite communication system 100 shown in FIG. 1 may include: aircraft (e.g., airplanes, helicopters, blimps, balloons, etc.), trains, automobiles (e.g., cars, trucks, busses, etc.), watercraft (e.g., private boats, commercial shipping vessels, cruise ships, etc.) and others. Any or all such crafts may communicate via any one or more suitable communication system(s), including any suitable communication links, such as: a satellite communication system, an air-to-ground communication system, a hybrid satellite and air-to-ground communication system, a cellular communication systems, and others.

Craft 150 may include a two-way communication system 170 to facilitate bidirectional communication with satellite 120 via service communication link 114. Two-way communication system 170 may receive a forward link signal from satellite 120 and transmit a return link signal to satellite 120 via service communication link 114.

In the example depicted by FIG. 1, two-way communication system 170 includes an antenna system 152 in communication with a transceiver 154, a modem 156 in communication with transceiver 154, a network access unit 158 in communication with modem 156, a wireless access point 164 in communication with network access unit 158, one or more client devices 166 in wireless communication with wireless access point 164, a craft media delivery system 160 in communication with network access unit 158, and one or more client devices 162 in communication with craft media delivery system 160.

Client devices 162 may include fixed or on-craft devices, such as passenger seat-back systems or other devices on craft 150. Client devices 162 may communicate with craft media delivery system 160 via a communication link that may be wired or wireless, for example, as part of a local area network such as a wireless local area network (WLAN). Client devices 162 may execute one or more applications that provide an interface for users on the craft 150 to obtain and consume linear media channels, as previously described and as will be described in more detail in connection with the following figures. The user may have the option to select/request one or more linear media channels from the interface. When a user selects a particular linear media channel for consumption, client devices 162 may transmit a request for the selected linear media channel to craft media delivery system 160.

Craft media delivery system 160 is configured to receive the request for the selected linear media channel from client devices 162 and forward the request to network access unit 158. Craft media delivery system 160 is also configured to receive and buffer linear media channel packets associated with the selected linear media channel from network access unit 158 and provide those buffered linear media channel packets to the requesting client devices 162 for substantially real-time consumption. As will be described in more detail in connection with the following figures, craft media delivery system 160 may additionally be configured to transmit, to network access unit 158, an indication of a current buffer size of the linear media channel buffer within craft media delivery system 160 for use in data scheduling at network resource system 102. Craft media delivery system 160 can provide for on-board media distribution and can include one or more media servers, media storage devices, etc. Craft media delivery system 160 can broker distribution of linear media channels, by managing requests for the channels from the client devices 162, and distributing the channels to the client devices 162 according to the requests. The functions of craft media delivery system 160 can be implemented in hardware, instructions embodied in memory and formatted to be executed by one or more general or application-specific processors, firmware, or any combination thereof. In the illustrated embodiment, the craft media delivery system 160 is shown as a separate component. In alternative embodiments, some or all of the functionality of the craft media delivery system 160 may be integrated into the network access unit 158.

Client devices 166 may include personal client devices configured to receive and display network data and that may be brought onto craft 150 by passengers (e.g., mobile phones, tablets, laptop computers, etc.). Client devices 166 may execute one or more applications that provide an interface for users to obtain and consume network data, as previously described and as will be described in more detail in connection with the following figures. The user may have the option to select/request network content for viewing from the interface. When a user interacts with client devices 162, the client devices 162 may transmit a request for the selected network content to network access unit 158 via wireless access point 164. Client devices 166 are also configured to receive the requested network content from the network access unit 158 via wireless access point 164. Wireless access point 164 is configured to provide communication between network access unit 158 and client devices 166.

Network access unit 158 is configured to receive the request(s) for the selected linear media channel(s) and the indication(s) of the current buffer size of the linear media channel buffer from craft media delivery system 160 and multiplex and forward them to modem 156. Network access unit 158 is also configured to receive and demultiplex linear media channel packets associated with the selected linear media channel from modem 156 and forward them to craft media delivery system 160.

Network access unit 158 is further configured to receive the requests for the selected network content from client devices 166 via wireless access point 164 and multiplex and forward them to modem 156. Network access unit 158 is also configured to receive and demultiplex network traffic packets associated with the selected network content and forward them to client devices 166 via wireless access point 164.

Modem 156 may receive all previously described requests, indications and any other data from client network access unit 158 and generate modulated data (e.g., a transmit intermediate frequency (IF) signal) for delivery to transceiver 154. Modem 156 may additionally receive the requested linear media channel data and requested network data as a modulated data (e.g., a receive intermediate frequency (IF) signal) from transceiver 154 and demodulate that data for transmission to network access unit 158. In some embodiments, the modem 156 is integrated with the network access unit 158, while in others modem 156 is a separate component.

Transceiver 154 may up-convert and amplify the modulated data received from modem 156 to generate a return link signal of the service communication link 114 for transmission to satellite 120 via antenna system 152. Similarly, transceiver 154 may receive the forward link signal of the service communication link 114 from satellite 120 via antenna system 152. Transceiver 154 may then amplify and down-convert the forward link signal to generate modulated downlink data (e.g., a receive IF signal) for demodulation by the modem 156.

Although the above description details certain client devices 162 communicating with craft media delivery system 160 to request and receive linear media channels, and other client devices 166 communicating with the network access unit 158 to request and receive network data, the present application also contemplates that client devices 162 could also request and receive network data, and that client devices 166 could also request and receive linear media channel data. In such embodiments, each of craft media delivery system 160 and network access unit 158 may further include functionality of the other as previously described in order to support such requesting and receiving configurations of client devices 162 and 166. The functions of each of craft media delivery system 160 and network access unit 158 can be implemented in hardware, instructions embodied in a memory and formatted to be executed by one or more general or application-specific processors, firmware, or any combination thereof.

Figure 2:
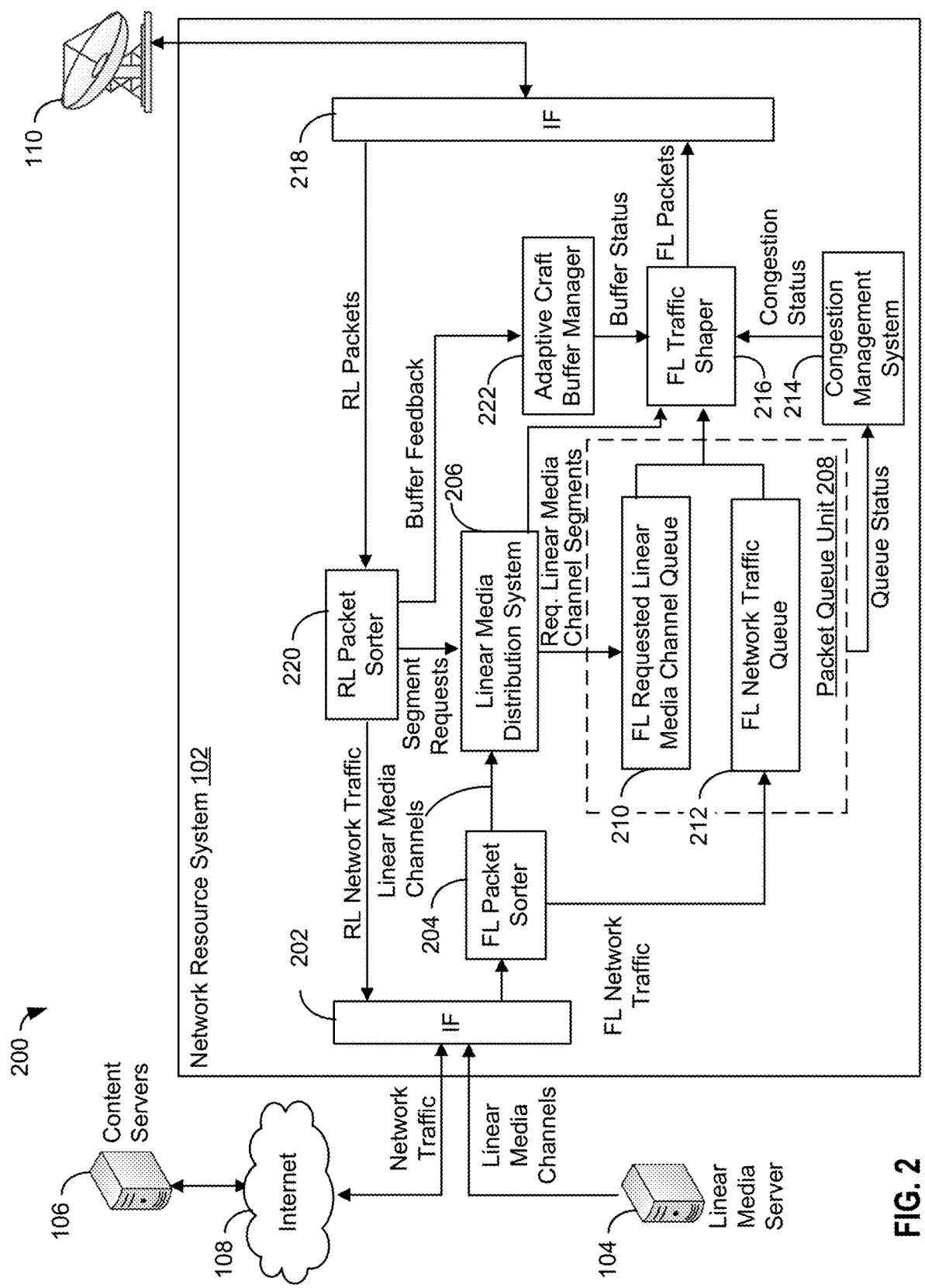
FIG. 2 depicts a simplified diagram of the network resource system described in connection with FIG. 1, in accordance with some embodiments.

FIG. 2 depicts a diagram 200 of network resource system 102 described in connection with FIG. 1, in accordance with some embodiments. Many other configurations are possible having more or fewer components. Moreover, the functionalities described herein can be distributed among the components in a different manner than described herein. FIG. 2 shows content server 106, Internet 108, linear media server 104, network resource system 102, and ground terminal 110 in communication as previously described in connection with FIG. 1. As further shown by FIG. 2, in some embodiments network resource system 102 comprises an interface 202 configured to provide communication between network resource system 102 and linear media server 104 and/or content servers 106 via Internet 108. For example, interface 202 may be configured to receive network data for requested network content (e.g., web browsing content, texting, chatting, or other web-based communications, which may but do not necessarily require inclusion of on-demand media) from content server 106 and linear media channel data from linear media server 104. In some embodiments, particular network data may be received from content server 106 at interface 202 based on a request from a user of client devices 166 (see FIG. 1), while media on all available linear media channels may be received from linear media server 104 regardless of any request from the user. In some alternative embodiments, only linear media channels requested by at least one client 162 on a craft serviced by network resource system 102 are received from linear media server 104. In such alternative embodiments, such requests for linear media channels may be routed back to linear media server 104, as will be described in more detail below. Interface 202 may communicate data received from content server 106 and from linear media server 104 to a forward link packet sorter 204.

Forward link packet sorter 204 is configured to sort packets of data from content server 106 and from linear media server 104. Forward link packet sorter 204 is configured to forward packets of linear media channel data from the linear media server 104 to a linear media distribution system 206. In some embodiments, these packets may be sorted and forwarded based on source and/or destination addresses in the header of the packets. In other embodiments, other techniques may be used such as packet inspection, other packet tags, etc. Forward link packet sorter 204 is also configured to forward packets of other network content data to a packet queue unit 208, specifically to a forward link network traffic queue 212 within packet queue unit 208.

Linear media distribution system 206 may be configured to forward only linear media channel segments to packet queue unit 208, specifically to a forward link requested linear media channel queue 210 within packet queue unit 208. For example, only segments carrying data for linear media channels actually requested by at least one user of a client on craft 150 (see FIG. 1), or on any other craft or terminal serviced by communication links 112, 114 may be forwarded to packet queue unit 208 by linear media distribution system 206. In this way, the feeder communication link 112 and service communication link 114 may be efficiently utilized by only allowing requested linear media channels through for ultimate transmission, as compared to transmitting all the linear media channels available from the linear media server 104 regardless of whether any passenger is consuming. For the purpose of FIG. 2 and from the perspective of network resource system 102, a linear media channel is requested if it has been requested by any client device on any craft or other terminal serviced by network resource system 102. However, if one of these requested linear media channels was not specifically requested by a client device on craft 150, that linear media channel would not be a requested linear media channel from the perspective of craft 150 or from the perspective of any component located thereon. In other words, from the perspective of craft 150, that linear media channel would be an "unrequested" linear media channel. However, due to the shared nature of the communication links 112, 114, the craft 150 may receive linear media channel packets of the unrequested linear media channel because it may have been requested by another craft sharing the same communication links 112, 114. In some embodiments, and as will be described in more detail in connection with FIG. 13, linear media distribution system 206 may be in communication with forward link traffic shaper 216 and may be configured to provide an indication of a selected modcode to the forward link traffic shaper for linear media channel packets of the requested linear media channel segments.

The information contained in the segment requests and the manner in which the linear media distribution system 206 handles the segment requests can vary from embodiment to embodiment. A segment request can include information (e.g., a channel ID) that can be used by the linear media distribution system 206 to identify the particular linear media channel being requested. A segment request can include information (e.g., the source IP address of the craft media delivery system 160) that can be used by the linear media distribution system 206 to identify the particular craft 150 from which the request originated. In some embodiments, the segment request is a "blind" request for the next linear media channel segment of the requested linear media channel, because the segment request does not include information (e.g., a segment ID) that uniquely identifies what the next linear media channel segment is. In such a case, the linear media distribution system 206 may, upon receiving such a request, provide the segment of the linear media channel that follows the last segment of the requested linear media channel that was provided to the craft 150. In such a case, in some embodiments in which a segment request may be a request for one or more prior segments (discussed in more detail below with respect to FIG. 8) of a previously unrequested linear media channel for the craft 150, the prior segment request may be a "blind" request for the one or more prior segments. The linear media distribution system 206 may include memory to cache a certain number of prior segments of each of the linear media channels obtained from the linear media server 104 preceding the most recent segments that have been obtained for each linear media channel, and in response to receiving such a request can retrieve the one or more prior segments from the memory and provide them to the forward link requested linear media channel queue 210. This may be done for previously unrequested linear media channels from craft 150 in order to quickly fill local media buffer (See, for example FIG. 3, ref. no. 302) of the craft media delivery system 160 on craft 150.

In some embodiments, a segment request can include information (e.g., a segment ID) identifying the particular segment of the requested linear media channel. In such a case, the linear media distribution system 206 can provide the particular segment to the forward link requested linear media channel queue 210. In such a case, a segment request for a previously unrequested linear media channel for the craft 150 may be a "join" request for the linear media channel without the identifying any particular segment. In some embodiments, for previously unrequested linear media channels from craft 150, the segment requests from craft 150 may contain segment IDs referencing prior segments, so that craft 150 may quickly fill the local media buffer of the craft media delivery system 160. In some embodiments, these prior segment IDs may be calculated by craft 150 independently based on the segment ID of the most recent (current) segment of the linear media channel that has been received by the network resource system 102 from the linear media server 104. For example, upon receiving a join request, the network resource system 102 may provide the segment ID of the most recent segment to the craft media delivery system 160, in order to allow the craft media delivery system 160 to determine the segment ID of as many prior segments as needed to fill the local media buffer of the craft media delivery system 160 (for example, if the segment ID incremented by 1 per segment, the craft media delivery system 160 could simply decrement from the segment ID of the most recent segment). In other embodiments, linear media distribution system 206 may, upon receiving a join request, provide the segment IDs of some number of prior segments to the craft media delivery system 160, in order to allow craft media delivery system 160 to request as many prior segments as needed to fill the local media buffer of the craft media delivery system 160.

Packet queue unit 208 may be configured to provide queued packets from each of forward link requested linear media channel queue 210 and forward link network traffic queue 212 to a forward link traffic shaper 216. Forward link traffic shaper 216 may then retrieve queued packets from forward link requested linear media channel queue 210 and forward link network traffic queue 212 and form a forward link packet stream based on the manner in which the forward link packets will be shaped. In some embodiments, forward link traffic shaper 216 may retrieve packets from each queue on a first-in-first-out (FIFO) basis. Packet queue unit 208 may also be configured to provide an indication of a queue status associated with one or both of communication links 112, 114 for each of forward link requested linear media channel queue 210 and forward link network traffic queue 212 to a congestion management system 214. Based on the status of (e.g., amount of data queued in) each queue, congestion management system 214 is configured to provide a congestion status indication to forward link traffic shaper 216. For example, if an amount of data queued in each queue satisfies a congestion threshold, congestion management system 214 may provide an indication of a congested state of one or both of feeder communication link 112 and service communication link 114 (see FIG. 1) to forward link traffic shaper 216. In some embodiments "satisfies" and "satisfy" means above the threshold and "does not satisfy" means equal to or below the threshold. In other embodiments, the "satisfies" and "satisfy" means above or equal to the threshold, and "does not satisfy" means below the threshold. Such a congestion threshold correspond to an amount of capacity apportioned for communication with a particular craft, an amount of capacity apportioned for communication with a particular group of crafts, or an actual capacity of one or more components or communication links along the data path from network resource system 102 to client devices 162 and 166 on craft 150.

For example, as used herein, a communication link is considered "congested" when a committed amount of data to be communicated via the communication link over a predetermined period of time (i.e., "demand") is greater than or equal to the amount of data the beam is allotted to communicate or capable of communicating over that predetermined period of time (i.e., "supply"), or some offset thereof. For example, a communication link can be considered "congested" when the committed data reaches a certain level (e.g., 85%) of the amount of data it is allotted to communicate or capable of communicating over a predetermined period of time. In some embodiments, portions of a communication link's capacity may be allocated to particular purposes, so that congestion can be further defined in context of demand versus supply of a particular type of traffic and/or a particular type of terminal. According to such definitions, a communication link can be considered as having available (or excess) capacity when it is uncongested.

Network resource system 102 further comprises an interface 218 configured to provide communication between the network resource system 102 and craft 150 via ground terminal 110, feeder communication link 112, satellite 120, and service communication link 114. For example, interface 218 may be configured to receive return link packets from craft 150 and forward those received return link packets to a return link packet sorter 220. Return link packet sorter 220 is configured to sort those received return link packets and forward each return link packet toward the appropriate destination. For example, return link packet sorter 220 may be configured to forward return link network traffic data to interface 202 for transmission to content servers 106 via Internet 108, forward requests for segments of linear media channel data to linear media distribution system 206, and forward buffer feedback indicating current queue size of a linear media channel data buffer located on the craft 150 (see FIGS. 1, 3 and 10) to an adaptive craft buffer manager 222 within network resource system 102. In some alternative embodiments, as previously described, only requested linear media channels are provided by linear media server 104 to network resource system 102. In such alternative embodiments, return link packet sorter 220 may be configured to forward requests for segments of linear media channel data to interface 202 for transmission to linear media server 104, rather than to linear media distribution system 206. In such alternative embodiments, network resource system 102 may not include linear media distribution system 206, and forward link packet sorter 204 may be configured to forward packets of requested linear media channel data from the linear media server 104 to forward link requested linear media channel queue 210.

Adaptive craft buffer manager 222 is configured to provide a buffer status indication to forward link traffic shaper 216 based at least in part on the buffer feedback received from return link packet sorter 220 and ultimately from craft media delivery system 160 on craft 150 (see FIGS. 1, 3, and 10) indicating an amount of currently buffered linear media channel data in the linear media channel data buffer located on the craft 150.

Forward link traffic shaper 216 may be further configured to determine the proportion of buffered requested linear media channel packets, and the proportion of buffered network traffic packets to be forwarded in forward link packets to the interface 218 based at least in part on the congestion status indication from congestion management system 214 and the buffer status indication from adaptive craft buffer manager 222. For example, forward link traffic shaper 216 may determine whether linear media channel packets may be delayed due to a congestion condition, for example if the buffer status indication satisfies a first buffer threshold indicating sufficient buffered data at the craft 150 to justify such a delay. In some embodiments "satisfies" and "satisfy" means above the threshold and "does not satisfy" means equal to or below the threshold. In other embodiments, the "satisfies" and "satisfy" means above or equal to the threshold, and "does not satisfy" means below the threshold. Forward link traffic shaper 216 may further determine whether previously delayed linear media channel packets should be transmitted despite a congestion condition, for example if the buffer status indication satisfies a second buffer threshold indicating insufficient buffered data at the craft 150 to allow further delay without interruption of streaming at the craft 150. In some embodiments "satisfies" and "satisfy" means above the threshold and "does not satisfy" means equal to or below the threshold. In other embodiments, the "satisfies" and "satisfy" means above or equal to the threshold, and "does not satisfy" means below the threshold. Forward link traffic shaper 216 may further determine whether previously delayed buffered linear media channel packets and/or other buffered network traffic data should be transmitted at an increased rate after resolution of a congestion condition in order to restore buffer levels to a desired level at the craft 150. Accordingly, forward link traffic shaper 216 may multiplex the requested linear media channel data and other requested network data for subsequent transmission to craft 150 via ground terminal 110, feeder communication link 112, satellite 120, and service communication link 114.

In some alternative embodiments, buffer feedback may not be sent by craft media delivery system 160 on craft 150 (see FIGS. 1, 3, and 10) to network resource system 102 (see FIGS. 1 and 2). In such alternative embodiments, adaptive craft buffer manager 222 may provide the buffer status indication to forward link traffic shaper 216 based on a variety of different factors, such as the number of requested linear media channels, how frequently linear media channel packets are transmitted to craft 150 (e.g., an average rate of requested linear media channel packet transmission determined over a prior time interval) and an estimated or assumed playback rate of the linear media channel(s) data at the craft 150.

For example, consider a case where a single linear media channel is requested. It can be assumed that a local media buffer on craft 150 (see FIG. 3) maintains a nominal media buffer size. For example, the nominal media buffer size could be between 30 and 60 seconds of buffered linear media channel data. It can also be assumed that the requested linear media channel data in the local media buffer is consumed by client devices 162 on the craft 150 at a known rate, such as a nominal linear media consumption rate. For example, the linear media channel data may be consumed at a rate measured in frames per second (FPS). Because the network resource system 102 knows the actual transmission rate of the linear media data, it may further estimate the status of the media buffer on craft 150 based on any difference between the previous transmission rate of the linear media channel data and the nominal media consumption rate of the linear media channel data. Network resource system 102 may then generate an indication of whether media buffer 302 associated with media delivery system 160 on craft 150 satisfies or does not satisfy the threshold based on whether the estimated media buffer size satisfies or does not satisfy the threshold.

For example, if an actual transmission rate of the requested linear media channel data exceeds the known rate of consumption, the buffer size for the requested linear media channel on craft 150 should rise above the nominal media buffer size. If, on the other hand, the actual transmission rate of the requested linear media channel data is less than the known rate of consumption, the buffer size for the requested linear media channel on craft 150 should fall below the nominal media buffer size. Accordingly, over a period of time, adaptive craft buffer manager 222 may periodically or continuously estimate the size of the local media buffer on the craft based on varying differences between the known rate of consumption of requested linear media channel data (at craft 150) and the actual rate of transmission of the requested linear media channel data (to craft 150). If this estimated size of the local media buffer at craft 150 is equal to or less than a minimum buffer threshold, adaptive craft buffer manager 222 may indicate this in the buffer status indication to forward link traffic shaper 216.

Figure 3:
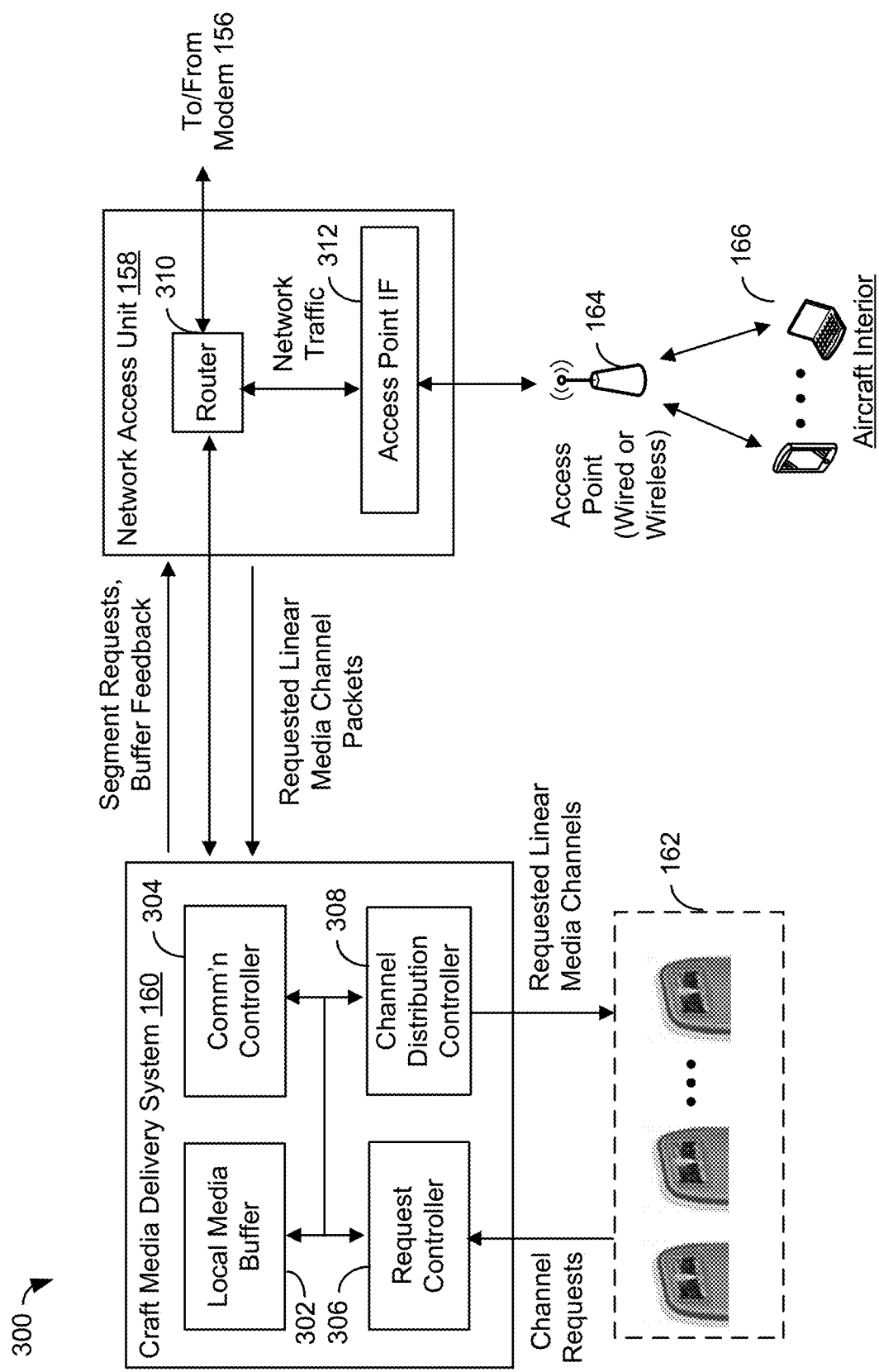
FIG. 3 depicts a simplified diagram of the craft media delivery system and network access unit described in connection with FIG. 1, in accordance with some embodiments.

FIG. 3 depicts a diagram 300 of craft media delivery system 160 and network access unit 158 as described in connection with FIG. 1, in accordance with some embodiments. Many other configurations are possible having more or fewer components. Moreover, the functionalities described herein can be distributed among the components in a different manner than described herein. FIG. 3 further shows client devices 162, client device 166, and wireless access point 164 as previously described in connection with FIG. 1. Craft media delivery system 160 comprises a local media buffer 302 (as previously described in connection with FIG. 2), a communication controller 304, a request controller 306, and a channel distribution controller 308, each in communication with one another. In the illustrated embodiment, local media buffer 302 is shown within craft media delivery system 160. In other embodiments, local media buffer 302 may be distributed between storage devices within craft media delivery system 160 and client devices 162. In yet other embodiments, local media buffer 302 may be entirely within storage devices of client devices 162.

Request controller 306 may be configured to receive linear media channel requests from one or more client devices 162 and provide indications of these requests to at least one of local media buffer 302, channel distribution controller 308, and communication controller 304. In some embodiments, the request controller 306 generates segments requests in response to the requests from the client devices 162.

Communication controller 304 may be configured to provide linear media channel data segment requests and/or buffer feedback associated with the amount of data buffered in local media buffer 302 to network access unit 158, and to receive requested linear media channel packets from network access unit 158.

As previously described in connection with FIG. 2, local media buffer 302 may be configured to buffer linear media channel data received from network resource system 102 and provide that buffered data to channel distribution controller 308.

Channel distribution controller 308 may be configured to provide the linear media channel data for requested linear media channels to the appropriate requesting client devices 162 from local media buffer 302.

Network access unit 158 comprises a router 310 and an access point interface 312. Network access unit 158 may be configured to establish a plurality of connections with a plurality of client devices 166 on craft 150, as well as establish communication with craft media delivery system 160. Router 310 is configured to receive the linear media channel data segment requests and buffer feedback (e.g., an indication of an amount of data buffered in at least local media buffer 302) from craft media delivery system 160 and provide them to modem 156 (see FIG. 1) for subsequent transmission to network resource system 102 (see FIG. 2). Router 310 is further configured to receive requested linear media channel packets from modem 156 and provide them to craft media delivery system 160. Router 310 is further configured to provide requested network traffic data between access point interface 312 and modem 156. Thus, network access unit 158, and specifically router 310, may be configured to associate each respective network with a respective client device 166 on craft 150. Access point interface 312 is configured to provide a communication interface between router 310 and wireless access point 164, which provides communication with client devices 166. Thus, in embodiments where client devices 166 are also configured to request linear media channels and present them to a user on craft 150, router 310 may also be configured to receive requests for linear media channel segments of a group (or subset) of linear media channels from among a plurality of linear media channels offered within craft 150. In such embodiments, requests for linear media channel segments originating from either of client devices 162 or 166 may be considered as originating on craft 150.

Figure 4:
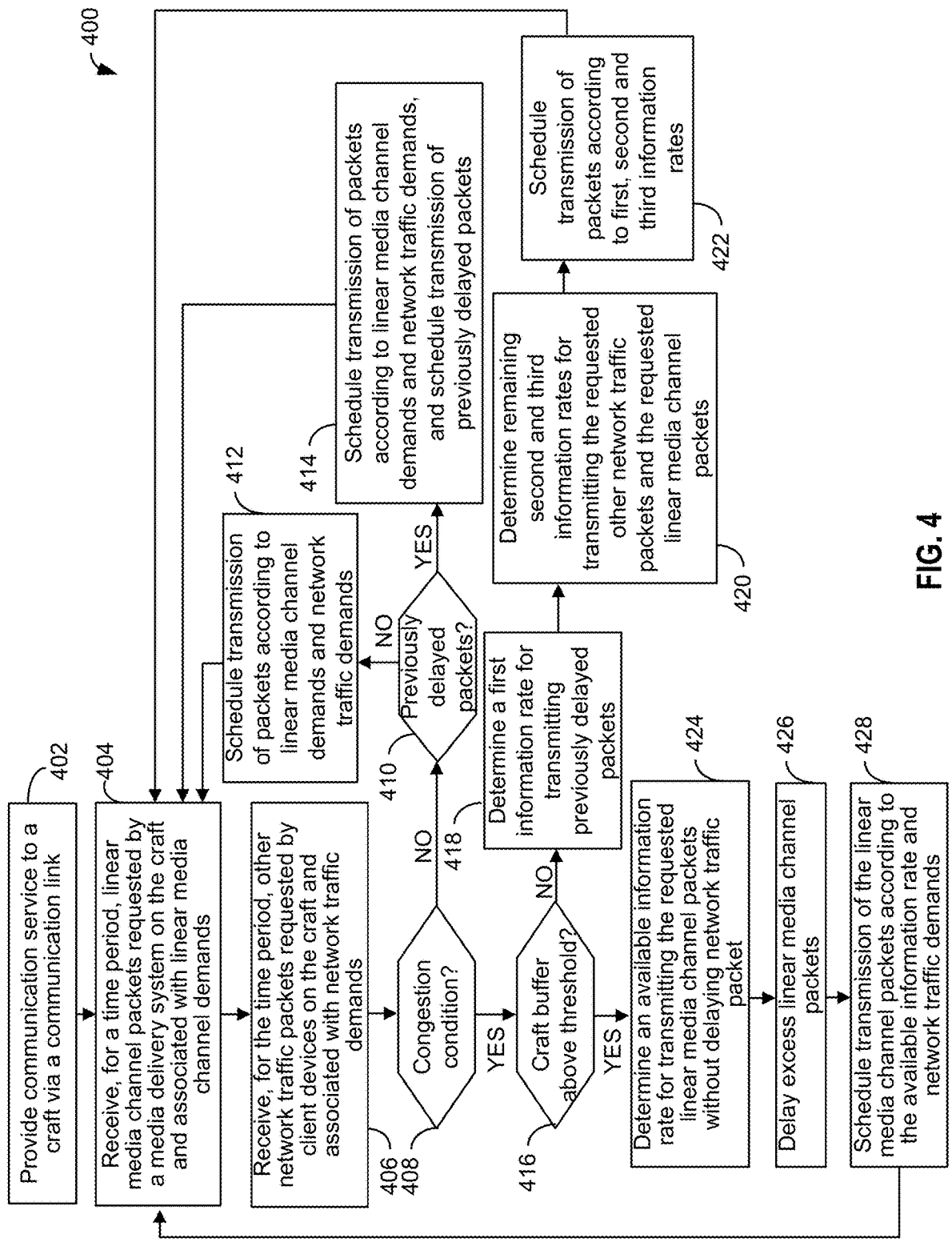
FIG. 4 depicts a flow chart of traffic shaping performed by the forward link traffic shaper described in connection with FIG. 1, in accordance with some embodiments.

FIG. 4 depicts a flow chart 400 of traffic shaping performed by, for example, forward link traffic shaper 216 described in connection with FIG. 2, in accordance with some embodiments. Although particular steps are described herein, these steps may be interchanged with one another or omitted in other embodiments.

Flow chart 400 includes step 402, which includes providing communication service to a craft via a communication link. For example, as previously described in connection with FIG. 2, since forward link traffic shaper 216 determines what data is ultimately sent from either of content server 106 and linear media server 104 to ground terminal 110, forward link traffic shaper 216 may be considered as providing communication service to craft 150 via feeder communication link 112 and service communication link 114.

Flow chart 400 advances from step 402 to step 404, which includes receiving, for a time period, linear media channel packets requested by a media delivery system on the craft and associated with linear media channel traffic demands. In some embodiments, the time period may be a shorter interval than would be required to deplete local media buffer 302 of craft media delivery system 160 on craft 150 (see FIG. 3). In some embodiments, the time period may correspond to a length of a frame of the linear media channel as consumed, for example, 1-10 milliseconds, although any other appropriate length is also contemplated. For example, as previously described in connection with FIGS. 2 and 3, forward link traffic shaper 216 may be configured to receive linear media channel packets from, e.g., forward link requested linear media channel queue 210 of packet queue unit 208. As previously described, only segments carrying data for linear media channels actually requested (i.e., demanded) by craft media delivery system 160, e.g., requested by at least one client 162 on craft 150 or on any other craft serviced by network resource system 102, may be forwarded to packet queue unit 208 by linear media distribution system 206.

Flow chart 400 advances from step 404 to step 406, which includes receiving, for the time period, network traffic packets requested by client devices on the craft and associated with network traffic demands. For example, as previously described in connection with FIGS. 2 and 3, forward link traffic shaper 216 may be configured to receive buffered data from forward link network traffic queue 212 from packet queue unit 208.

Flow chart 400 advances from step 406 to step 408, which includes determining whether a congestion condition exists. For example, as previously described in connection with FIG. 2, packet queue unit 208 may be configured to provide a queue status indication for each of forward link requested linear media channel queue 210 and forward link network traffic queue 212 to congestion management system 214. Based on the status of each queue (e.g., the amount of data queued in each queue), congestion management system 214 is configured to provide a congestion status indication to forward link traffic shaper 216. For example, if an amount of data queued in each queue satisfies a congestion threshold, congestion management system 214 may provide an indication of a congested state of one or both of feeder communication link 112 and service communication link 114 (see FIG. 1) to forward link traffic shaper 216.

If the determination at step 408 is NO (i.e., the communication link is not congested), flow chart 400 advances to step 410, which includes determining whether there are any previously delayed packets. For example, forward link traffic shaper 216 may determine whether it had previously made an affirmative determination to delay the transmission of any packets and, if so, whether those delayed packets have yet to be transmitted from forward link traffic shaper 216.

If the determination at step 410 is NO (i.e., there are no previously delayed packets to be transmitted), flow chart 400 advances to step 412, which includes scheduling transmission of packets according to linear media channel demands and network traffic demands. For example, when uncongested (e.g., sufficient capacity is available or allocated to transmit all packets for requested linear media channel data and for requested network data) for the time period, forward link traffic shaper 216 may be configured to schedule transmission of packets based on their demand. For example, forward link traffic shaper 216 may retrieve packets from forward link requested linear media channel queue 210 and from forward link network traffic queue 212 according to the determined scheduling and multiplex the retrieved packets to form a stream of forward link packets that is provided to interface 218 (see FIG. 2). The stream of forward link packets is then provided by interface 218 to a transmitter in ground terminal 110 that modulates the packets, upconverts, amplifies and transmits them to craft 150 via feeder communication link 112, satellite 120, and service communication link 114. Flow chart 400 may then advance back to step 404.

If the determination at step 410 is YES (i.e., there are previously delayed packets yet to be transmitted), flow chart 400 advances to step 414, which includes scheduling transmission of packets according to linear media channel demands and network traffic demands, and schedule transmission of the previously delayed packets. For example, where no congestion condition exists but previously affirmatively delayed packets have yet to be transmitted, forward link traffic shaper 216 may be configured to schedule transmission of those previously affirmatively delayed packets and also schedule transmission of following packets based on their demand. For example, forward link traffic shaper 216 may retrieve packets from forward link requested linear media channel queue 210 and from forward link network traffic queue 212 according to the determined scheduling and multiplex the retrieved packets to form a stream of forward link packets that is provided to interface 218 (see FIG. 2). The stream of forward link packets is then provided by interface 218 to a transmitter in ground terminal 110 that modulates the packets, upconverts, amplifies and transmits them to craft 150 via feeder communication link 112, satellite 120, and service communication link 114. Flow chart 400 may then advance back to step 404.

Though not shown in FIG. 4, in some scenarios, the number of previously delayed packets to be scheduled for transmission in step 414 may create a congested condition on the communication link. Consequently, it may be necessary in such scenarios to adjust the scheduling of packets according to linear media channel demands and network traffic demands to account for the congested condition. For example, the steps described in steps 418, 420, 422 may be implemented to adjust scheduling of the previously delayed packets, the requested linear media channel packets, and the network traffic packets.

Returning to step 408, if the determination at step 408 is YES (i.e., the communication links are congested, as indicated by insufficient capacity availability or allocation to transmit all packets for currently requested linear media channel data and for requested network data), flow chart 400 advances to step 416, which includes a determination as to whether local media buffer 302 of craft media delivery system 160 on craft 150 is above a threshold.

If the determination at step 416 is YES (i.e., the buffered linear media channel data in local media buffer 302 equals or exceeds the threshold sufficient to continue streaming by drawing down the local media buffer 302 during the time period), flow chart 400 advances to step 424, which includes determining an available information rate for transmitting the requested linear media channel packets without delaying requested network traffic packets. In some embodiments, available information rate may be an information rate that both satisfies an allocated information rate for craft 150 and does not require delaying any requested network traffic. In some embodiments, determining this available information rate is based on a difference between an allocated information rate over one or both of communication links 112 and 114, and an information rate required to fulfill the requested network traffic demands. In some embodiments, an allocated information rate may be a minimum information rate for craft 150, for example.

Flow chart 400 advances from step 424 to step 426, which includes delaying excess linear media channel packets. For example, at step 426, forward link traffic shaper 216 determines a congestion condition, which indicates there is insufficient allocated capacity to transmit all requested linear media channel data and all requested network traffic data to craft 150. Since the available information rate determined at step 424 is the capacity remaining after allotting for all requested network traffic data, forward link traffic shaper 216 delays the excess linear media channel packets until a congestion condition is no longer present. Thus, delaying transmission of a subset of the linear media channel packets to the craft via the communication link may be based on a difference between the available information rate and the linear media channel demand.

Flow chart 400 advances from step 426 to step 428, which includes scheduling transmission of the linear media channel packets according to the available information rate and network traffic demands. For example, forward link traffic shaper 216 may be configured to schedule transmission of the requested linear media channel packets not delayed in step 424 according to the available information rate. As previously described, the available information rate is based on the difference between the allocated information rate of one or both of communication links 112 and 114, and an information rate required to fulfill the requested network traffic demands. Forward link traffic shaper 216 may retrieve packets from forward link requested linear media channel queue 210 and from forward link network traffic queue 212 according to the determined scheduling and multiplex the retrieved packets to form a stream of forward link packets that is provided to interface 218 (see FIG. 2). The stream of forward link packets is then provided by interface 218 to a transmitter in ground terminal 110 that modulates the packets, upconverts, amplifies and transmits them to craft 150 via feeder communication link 112, satellite 120, and service communication link 114. Flow chart 400 advances from step 428 back to step 404.

Returning to step 416, if the determination at step 416 is NO (i.e., an amount of linear media channel data buffered in local media buffer 302 is below the threshold), flow chart 400 advances to step 418, which includes determining a first information rate for transmitting previously delayed packets. In some embodiments, forward link traffic shaper 216 is configured to determine the first information rate based on a minimum amount of the previously delayed packets that must be transmitted to avoid interruption of streaming of any of the requested linear media channels.

Flow chart 400 may advance from step 418 to step 420, which includes determining a second information rate for transmitting the network traffic packets and a third information rate for transmitting the requested linear media channel packets. In some embodiments, forward link traffic shaper 216 may determine a sum of the second information rate and the third information rate based on a difference between the supported information rate of one or both of the feeder communication link 112 and service communication link 114 and the first information rate determined in step 418. Forward link traffic shaper 216 may allocate the second information rate and the third information rate in any number of ways. For example, in some embodiments, forward link traffic shaper 216 may determine the second information rate sufficient to deliver all of the requested network traffic packets, and determine the third information rate as the remaining capacity from the sum of the second information rate and the third information rate. In such embodiments, new linear media channel packets may be delayed. In some embodiments, the second information rate is determined based on a difference between the first information rate and the supported information rate of the communication link (e.g., either or both of the feeder communication link 112 and the service communication link 114). In some embodiments, the third information rate is determined based on a difference between the supported information rate of the communication link (e.g., either or both of the feeder communication link 112 and the service communication link 114) and a summation of the first and second information rates. In such embodiments, delaying a subset of the received linear media channel packets may be based on a difference between the third information rate and the linear media channel demand.

Flow chart 400 advances from step 420 to step 422, which includes scheduling transmission of packets according to the first, second, and third information rates. For example, forward link traffic shaper 216 may be configured to schedule packets for transmission based on the first, second, and third information rates determined as previously described. For example, forward link traffic shaper 216 may retrieve packets from forward link requested linear media channel queue 210 and from forward link network traffic queue 212 according to the determined scheduling and multiplex the retrieved packets to form a stream of forward link packets that is provided to interface 218 (see FIG. 2). The stream of forward link packets is then provided by interface 218 to a transmitter in ground terminal 110 that modulates the packets, upconverts, amplifies and transmits them to craft 150 via feeder communication link 112, satellite 120, and service communication link 114. Flow chart 400 may advance from step 422 back to step 404.

Figure 5:
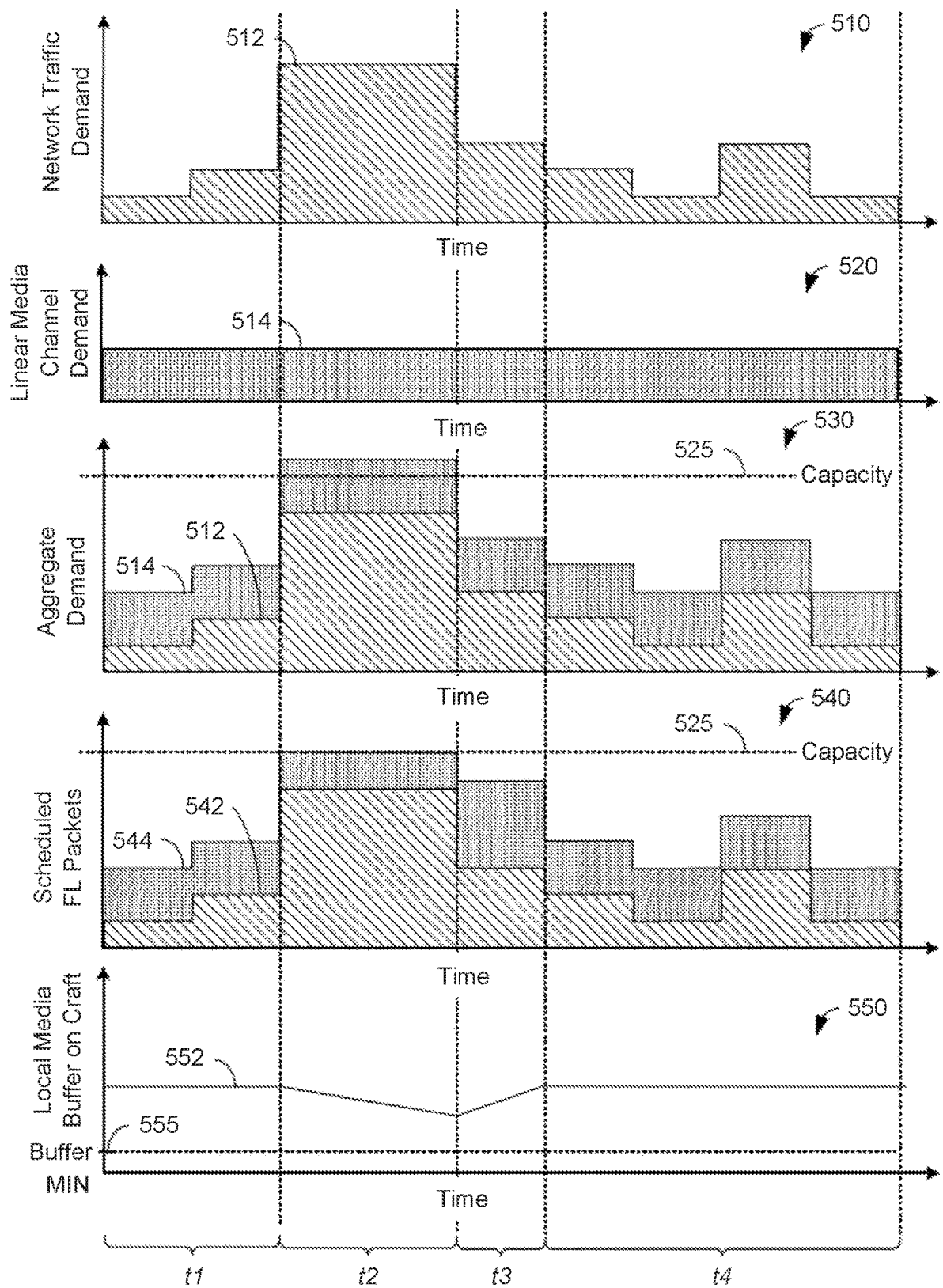
FIG. 5 depicts a plurality of plots illustrating delaying linear media channel data during forward link congestion and bursting delayed linear media channel data after forward link congestion resolution, in accordance with some embodiments.

FIG. 5 depicts a plurality of plots 510, 520, 530, 540, 550 illustrating delaying linear media channel data during forward link congestion and bursting delayed linear media channel data after forward link congestion resolution, in accordance with some embodiments. In some embodiments, the plots 510, 520, 530, 540, 550 may be described in the context of FIGS. 1-4 as previously described.

Plot 510 illustrates an example of requested network traffic demand versus time. For example, plot 510 displays on the vertical axis volume of network traffic data requested by user(s) of client devices 166 to be transmitted from content server 106 to craft 150 (see FIG. 1), and displays time on the horizontal axis. Plot 510 shows requested network traffic demand 512.

Plot 520 illustrates an example of requested linear media channel data demand versus time. For example, plot 520 displays on the vertical axis volume of linear media channel data requested by user(s) of client devices 162 to be transmitted from linear media server 104 to craft 150 (see FIG. 1), and displays time on the horizontal axis. Plot 520 shows linear media channel data demand 514. Although linear media channel data demand 514 is shown having a constant value for simplicity of illustration, linear media channel data demand 514 may vary as passengers request and terminate requests for individual channels.

Plot 530 illustrates an example of aggregate traffic demand versus time. For example, plot 530 displays on the vertical axis aggregate volume of the network traffic data requested by user(s) of client devices 166 and the linear media channel data requested by user(s) of client devices 162, and displays time on the horizontal axis. Plot 530 shows linear media channel data demand 514 from plot 520 stacked on requested network traffic demand 512 from plot 510. As shown in plot 530, the aggregate volume of requested data exceeds a capacity threshold 525 of one or both of feeder communication link 112 and 114 (see FIG. 1) during time segment t2. Capacity threshold 525 may be an allocated capacity for communication with a particular craft, with a particular group of crafts sharing the same satellite beam, or an actual capacity of one or more components or communication links between network resource system 102 and client devices 162 and 166. Capacity threshold 525 may be based on one or more of several factors including a minimum information rate for a craft, a peak information rate for the craft, and demands of other craft. Although shown constant to avoid over complication of the drawing, the capacity threshold 525 may change over time. For example, if there is excess capacity above what each client or craft as a whole needs, capacity threshold 525 may be increased.

Plot 540 illustrates an example of scheduled forward link packets versus time. For example, plot 540 displays on the vertical axis aggregate volume of the network traffic data requested by user(s) of client devices 166 and the linear media channel data requested by user(s) of client devices 162 that is actually scheduled by forward link traffic shaper 216 (see FIG. 2), and displays time on the horizontal axis. Plot 540 shows scheduled forward link packets of linear media channel data 544 stacked on scheduled forward link packets of requested network traffic data 542. As will be described in detail below, forward link traffic shaper 216 (see FIG. 2) may be configured to schedule forward link packets for transmission to craft 150 (see FIG. 1) such that the capacity threshold 525 of one or both of feeder communication link 112 and service communication link 114 is never exceeded while also permitting uninterrupted streaming of the requested linear media channels to passengers.

Plot 550 illustrates an example of an amount of buffered data in local media buffer 302 of craft media delivery system 160 on craft 150 (see FIGS. 1, 3 and 10) versus time. For example, plot 550 displays on the vertical axis the amount of buffered data in local media buffer 302, and displays time on the horizontal axis. Plot 550 shows an amount of buffered data in local media buffer 552 and also a minimum amount of buffered data threshold 555 required to maintain an uninterrupted streaming of requested linear media channels at client devices 162 on craft 150.

During time segment t1, no congestion condition exists because the aggregate of linear media channel data demand 514 and requested network traffic demand 512 does not satisfy capacity threshold 525, as shown in plot 530. As above, in some embodiments "satisfies" and "satisfy" means above the threshold and "does not satisfy" means equal to or below the threshold. In other embodiments, the "satisfies" and "satisfy" means above or equal to the threshold, and "does not satisfy" means below the threshold. Thus, as shown in plot 540, the volume of forward link packets of requested network traffic data 542 scheduled by forward link traffic shaper 216 matches or is substantially the same as the volume of requested network traffic demand 512 and the volume of forward link packets of linear media channel data 544 scheduled by forward link traffic shaper 216 matches or is substantially the same as the volume of linear media channel data demand 514 during time segment t1. Thus, as shown by plot 550, the amount of buffered data in local media buffer 552 remains substantially constant during time segment t1. Time segment t1 may correspond to multiple progressions through steps 402, 404, 406, 408 (determination NO), 410 (determination NO), and 412 of flow chart 400 of FIG. 4.

During time segment t2 a congestion condition exists because the aggregate of linear media channel data demand 514 and requested network traffic demand 512 satisfies capacity threshold 525, as shown in plot 530. Thus, as shown in plot 540, the volume of forward link packets of requested network traffic data 542 scheduled by forward link traffic shaper 216 matches or is substantially the same as the volume of requested network traffic demand 512 while the volume of forward link packets of linear media channel data 544 scheduled by forward link traffic shaper 216 is reduced compared to the volume of linear media channel data demand 514 during time segment t2. Thus, some linear media channel packets are delayed. As shown by plot 550, delaying some linear media channel packets results in a decline in the amount of buffered data in local media buffer 552 during time segment t2. Time segment t2 may correspond to multiple progressions through steps 402, 404, 406, 408 (determination YES), 416 (determination YES), 424, 426 and 428 of flow chart 400 of FIG. 4.

During time segment t3 no congestion condition exists because the aggregate of linear media channel data demand 514 and requested network traffic demand 512 does not satisfy capacity threshold 525, as shown in plot 530. Thus, as shown in plot 540, the volume of forward link packets of requested network traffic data 542 scheduled by forward link traffic shaper 216 matches or is substantially the same as the volume of requested network traffic demand 512 during time segment t3. However, because at least some linear media channel packets were delayed from transmission during time segment t2, the volume of forward link packets of linear media channel data 544 scheduled by forward link traffic shaper 216 exceeds the volume of linear media channel data demand 514 during time segment t3. This may be described as "bursting" the linear media channel packets at a rate that exceeds current demand for the time segment t3 in order to replenish the local media buffer 302 in craft media delivery system 160 of craft 150, as shown by the upward trend in the amount of buffered data in local media buffer 552 during time segment t3. Time segment t3 may correspond to multiple progressions through steps 402, 404, 406, 408 (determination NO), 410 (determination YES), and 414 of flow chart 400 of FIG. 4.

During time segment t4, no congestion condition exists because the aggregate of linear media channel data demand 514 and requested network traffic demand 512 does not satisfy capacity threshold 525, as shown in plot 530. Moreover, since delayed linear media channel packets were burst transmitted during time segment t3, no delayed packets remain to be transmitted. Thus, as shown in plot 540, the volume of forward link packets of requested network traffic data 542 scheduled by forward link traffic shaper 216 matches or is substantially the same as the volume of requested network traffic demand 512 and the volume of forward link packets of linear media channel data 544 scheduled by forward link traffic shaper 216 matches or is substantially the same as the volume of linear media channel data demand 514 during time segment t4. Thus, as shown by plot 550, the amount of buffered data in local media buffer 552 remains substantially constant during time segment t4. Time segment t4 may correspond to multiple progressions through steps 402, 404, 406, 408 (determination NO), 410 (determination NO), and 412 of flow chart 400 of FIG. 4, as during time segment t1.

Figure 6:
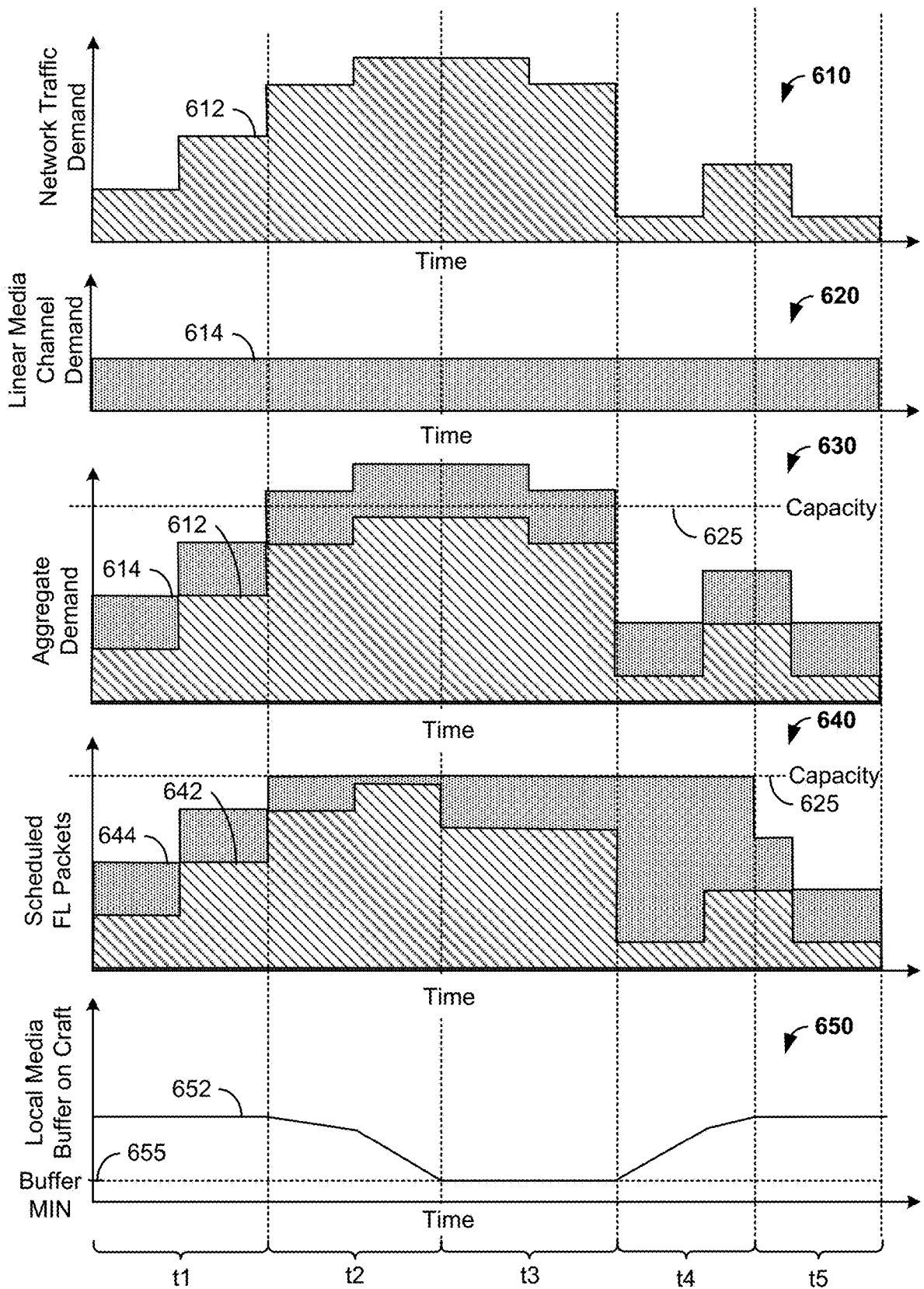
FIG. 6 depicts another plurality of plots illustrating delaying linear media channel data during forward link congestion and bursting delayed linear media channel data and network traffic data after forward link congestion resolution, in accordance with some embodiments.

FIG. 6 depicts another plurality of plots 610, 620, 630, 640, 650 illustrating delaying linear media channel data during forward link congestion and bursting delayed linear media channel data and network traffic data after forward link congestion resolution, in accordance with some embodiments. In some embodiments, the plots 610, 620, 630, 640, 650 may be described in the context of FIGS. 1-4 as previously described.

Plot 610 illustrates an example of requested network traffic demand versus time. For example, plot 610 displays on the vertical axis volume of network traffic data requested by user(s) of client device(s) 166 to be transmitted from content server 106 to craft 150 (see FIG. 1), and displays time on the horizontal axis. Plot 610 shows requested network traffic demand 612.

Plot 620 illustrates an example of requested linear media channel data demand versus time. For example, plot 620 displays on the vertical axis volume of linear media channel data requested by user(s) of client devices 162 to be transmitted from linear media server 104 to craft 150 (see FIG. 1), and displays time on the horizontal axis. Plot 620 shows linear media channel data demand 614. Although linear media channel data demand 614 is shown having a constant value for simplicity of illustration, linear media channel data demand 614 may vary as passengers request and terminate requests for individual channels.

Plot 630 illustrates an example of aggregate traffic demand versus time. For example, plot 630 displays on the vertical axis aggregate volume of the network traffic data requested by user(s) of client devices 166 and the linear media channel data requested by user(s) of client devices 162, and displays time on the horizontal axis. Plot 630 shows linear media channel data demand 614 from plot 620 stacked on requested network traffic demand 612 from plot 610. As shown in plot 630, the aggregate volume of requested data exceeds a capacity threshold 625 of one or both of feeder communication link 112 and service communication link 114 (see FIG. 1) during time segment t2. Capacity threshold 625 may be an allocated capacity for communication with a particular craft, with a particular group of crafts sharing the same satellite beam, or an actual capacity of one or more components or communication links between network resource system 102 and client devices 162 and 166. Capacity threshold 625 may be based on one or more of several factors including a minimum information rate for a craft, a peak information rate for the craft, and demands of other craft. Although shown constant to avoid over complication of the drawing, the capacity threshold 625 may change over time. For example, if there is excess capacity above what each client or craft as a whole needs, capacity threshold 625 may be increased.

Plot 640 illustrates an example of scheduled forward link packets versus time. For example, plot 640 displays on the vertical axis aggregate volume of the network traffic data requested by user(s) of client device(s) 166 and the linear media channel data requested by user(s) of client device(s) 162 that is actually scheduled by forward link traffic shaper 216 (see FIG. 2), and displays time on the horizontal axis. Plot 640 shows scheduled forward link packets of linear media channel data 644 stacked on scheduled forward link packets of requested network traffic data 642. As will be described in detail below, forward link traffic shaper 216 (see FIG. 2) may be configured to schedule forward link packets for transmission to craft 150 (see FIG. 1) such that the capacity threshold 625 of one or both of feeder communication link 112 and service communication link 114 is never exceeded.

Plot 650 illustrates an example of an amount of buffered data in local media buffer 302 of craft media delivery system 160 on craft 150 (see FIGS. 1 and 3) versus time. For example, plot 650 displays on the vertical axis the amount of buffered data in local media buffer 302, and displays time on the horizontal axis. Plot 650 shows an amount of buffered data in local media buffer 652 and also a minimum amount of buffered data threshold 655 required to maintain an uninterrupted streaming of requested linear media channels at client devices 162 on craft 150.

During time segment t1, no congestion condition exists because the aggregate of linear media channel data demand 614 and requested network traffic demand 612 does not satisfy capacity threshold 625, as shown in plot 630. Thus, as shown in plot 640, the volume of forward link packets of requested network traffic data 642 scheduled by forward link traffic shaper 216 matches or is substantially the same as the volume of requested network traffic demand 612 and the volume of forward link packets of linear media channel data 644 scheduled by forward link traffic shaper 216 matches or is substantially the same as the volume of linear media channel data demand 614 during time segment t1. Thus, as shown by plot 650, the amount of buffered data in local media buffer 652 remains substantially constant during time segment t1. Time segment t1 may correspond to progression through steps 402, 404, 406, 408 (determination NO), 410 (determination NO), and 412 of flow chart 400 of FIG. 4.

During time segment t2 a congestion condition exists because the aggregate of linear media channel data demand 614 and requested network traffic demand 612 satisfies capacity threshold 625, as shown in plot 630. Thus, as shown in plot 640, the volume of forward link packets of requested network traffic data 642 scheduled by forward link traffic shaper 216 matches or is substantially the same as the volume of requested network traffic demand 612 while the volume of forward link packets of linear media channel data 644 scheduled by forward link traffic shaper 216 is reduced compared to the volume of linear media channel data demand 614 during time segment t2. Thus, some linear media channel packets are delayed. As shown by plot 650, delaying some linear media channel packets results in a decline in the amount of buffered data in local media buffer 652 during time segment t2. By the end of time segment t2, the amount of buffered data in local media buffer 652 has fallen to the minimum amount of buffered data threshold 655, as shown in plot 650. Time segment t2 may correspond to progression through steps 402, 404, 406, 408 (determination YES), 416 (determination YES), 424, 426 and 428 of flow chart 400 of FIG. 4.

During time segment t3 a congestion condition exists because the aggregate of linear media channel data demand 614 and requested network traffic demand 612 satisfies capacity threshold 625, as shown in plot 630. However, in addition to the congestion condition, the amount of buffered data in local media buffer 652 has fallen to the minimum amount of buffered data threshold 655, as shown in plot 650. Thus, to avoid interruption of the streaming of the requested linear media channels on the craft (see FIG. 1), at least some linear media channel packets that were delayed from transmission during time segment t2 are scheduled for transmission during time segment t3. Thus, as shown in plot 640, the volume of forward link packets of linear media channel data 644 scheduled by forward link traffic shaper 216 at least matches, but may exceed, the volume of linear media channel data demand 614 during time segment t3 while the volume of forward link packets of requested network traffic data 642 scheduled by forward link traffic shaper 216 is reduced compared to the volume of requested network traffic demand 612. If the volume of forward link packets of linear media channel data 644 scheduled by forward link traffic shaper 216 matches the volume of linear media channel data demand 614, the amount of buffered data in local media buffer 652 will be maintained at the minimum amount of buffered data threshold 655, as shown in plot 650. If the volume of forward link packets of linear media channel data 644 scheduled by forward link traffic shaper 216 exceeds the volume of linear media channel data demand 614, the amount of buffered data in local media buffer 652 will rise during t3 (not shown in plot 650). This may be described as "bursting" the linear media channel packets at a rate that exceeds current demand for the time segment t3 in order to at least partially replenish the local media buffer 302 in craft media delivery system 160 of craft 150. Time segment t3 may correspond to progression through steps 402, 404, 406, 408 (determination YES), 416 (determination NO), 418, 420 and 422 of flow chart 400 of FIG. 4.

During time segment t4, no congestion condition exists because the aggregate of linear media channel data demand 614 and requested network traffic demand 612 does not satisfy capacity threshold 625, as shown in plot 630. However, because at least some linear media channel packets were delayed from transmission during at least time segment t2 and at least a subset of those delayed packets may still be delayed through time segment t3, the volume of forward link packets of linear media channel data 644 scheduled by forward link traffic shaper 216 exceeds the volume of linear media channel data demand 614 during time segment t4. This may be described as "bursting" the linear media channel packets at a rate that exceeds current demand for the time segment t4 in order to replenish the local media buffer 302 in craft media delivery system 160 of craft 150, as shown by the upward trend in the amount of buffered data in local media buffer 652 during time segment t4. Time segment t4 may correspond to progression through steps 402, 404, 406, 408 (determination NO), 410 (determination YES), and 414 of flow chart 400 of FIG. 4.

During time segment t5, no congestion condition exists because the aggregate of linear media channel data demand 614 and requested network traffic demand 612 does not satisfy capacity threshold 625, as shown in plot 630. Moreover, since delayed linear media channel packets were burst transmitted during at least time segment t4, no delayed packets remain to be transmitted. Thus, as shown in plot 640, the volume of forward link packets of requested network traffic data 642 scheduled by forward link traffic shaper 216 matches or is substantially the same as the volume of requested network traffic demand 612 and the volume of forward link packets of linear media channel data 644 scheduled by forward link traffic shaper 216 matches or is substantially the same as the volume of linear media channel data demand 614 during time segment t5. Thus, as shown by plot 650, the amount of buffered data in local media buffer 652 remains substantially constant during time segment t5. Time segment t5 may correspond to progression through steps 402, 404, 406, 408 (determination NO), 410 (determination NO), and 412 of flow chart 400 of FIG. 4, as during time segment t1.

Figure 7:
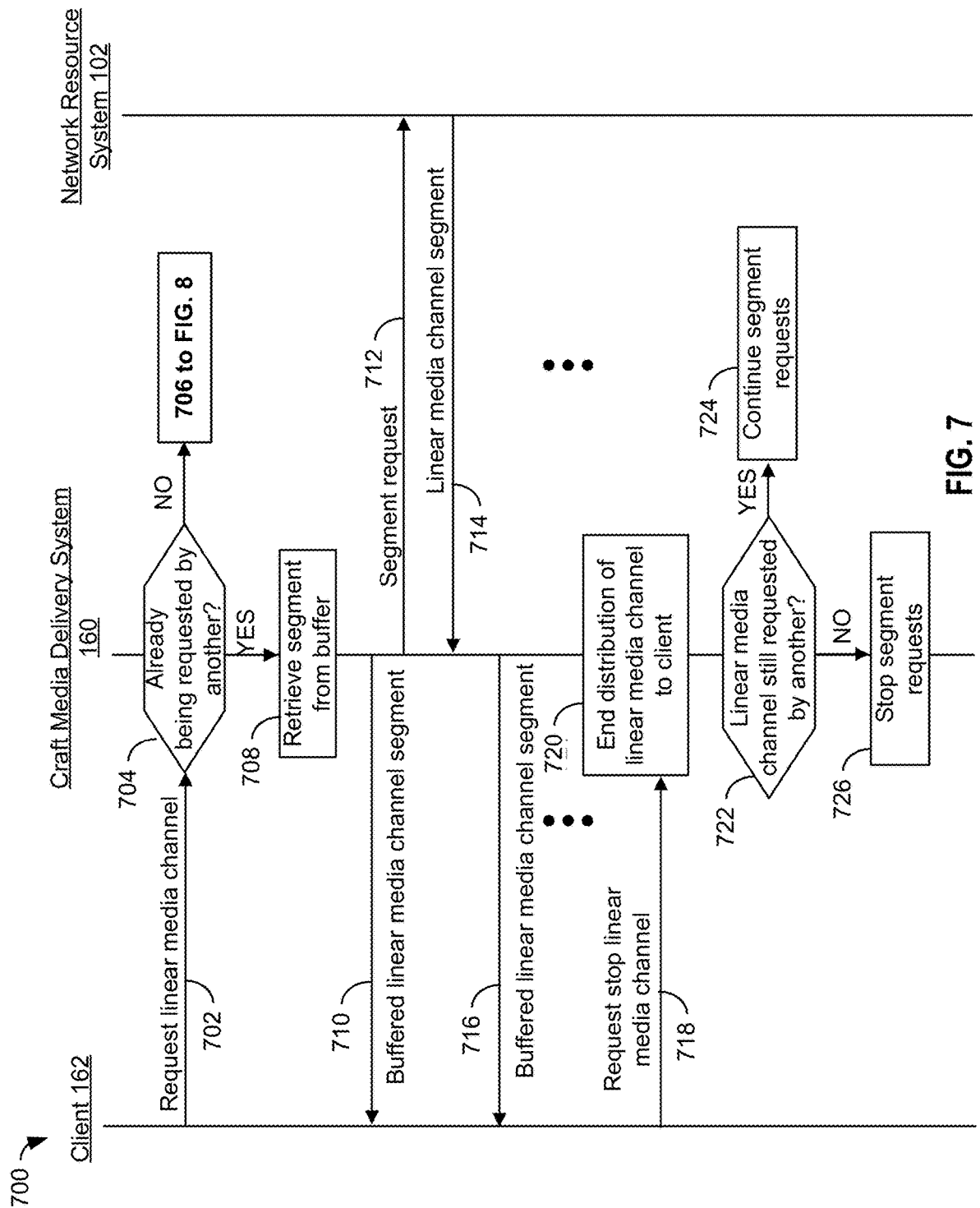
FIG. 7 depicts a call flow diagram of a request process for linear media channel data, in accordance with some embodiments.

FIG. 7 depicts a call flow diagram 700 of a process for requesting linear media channel data, in accordance with some embodiments. Call flow diagram 700 shows communication between one or more client devices 162, craft media delivery system 160, and network resource system 102 (see FIGS. 1-4).

Call flow diagram 700 shows client 162 sending a request 702 for one or more linear media channels to craft media delivery system 160. At step 704, craft media delivery system 160 determines whether the channel requested in request 702 is already being requested by another client 162 on craft 150 (see FIG. 1). If the determination at step 704 is NO (i.e., the requested linear media channel is, from the perspective of the craft 150, a previously unrequested linear media channel), call flow diagram 700 advances to step 706, which is described in more detail in connection with FIG. 8.

If the determination at step 704 is YES (i.e., the requested linear media channel has already been requested by another client on craft 150), call flow diagram 700 advances to step 708, which includes retrieving a current segment of the requested linear media channel from local media buffer 302 of craft media delivery system 160. Since another client 162 has already requested the linear media channel, at least one current segment of the linear media channel is already buffered in the local media buffer 302 and another request for that current segment from network resource system 102 is not required. Call flow diagram 700 then shows that craft media delivery system 160 sends the buffered linear media channel segment 710 to client device 162.

Call flow diagram 700 then shows that craft media delivery system 160 sends a request 712 for at least one following segment of the requested linear media channel to network resource system 102. In response, network resource system 102 sends the requested segment(s) 714 of the requested linear media channel to craft media delivery system 160. Upon receipt, craft media delivery system 160 buffers the linear media channel segment(s) in local media buffer 302 and sends the buffered linear media channel segment(s) 716 to client 162.

As indicated by the six dots, the process of craft media delivery system 160 sending request 712, network resource system 102 sending the requested segment(s) 714 and craft media delivery system 160 buffering and sending the buffered linear media channel segment(s) 716 to client 162 may be repeated as long as the client 162 is still requesting the linear media channel.

At some time, client 162 may send a request 718 to stop receiving the requested linear media channel. At step 720 craft media delivery system 160 ends distribution of the requested linear media channel to client 162. Call flow diagram 700 then advances to step 722 where a determination is made as to whether the linear media channel is still being requested by another client on craft 150.

If the determination at step 722 is YES (i.e., the linear media channel is still being requested by another client on craft 150), call flow diagram 700 advances to step 724 where segment request and receipt are continued, as previously described for request 712 and receipt of segment 714.

If the determination at step 722 is NO (i.e., the linear media channel is not still being requested by another client on craft 150), call flow diagram 700 advances to step 726, which includes terminating segment requests for the linear media channel, since that linear media channel is no longer being requested by any client devices on craft 150.

Figure 8:
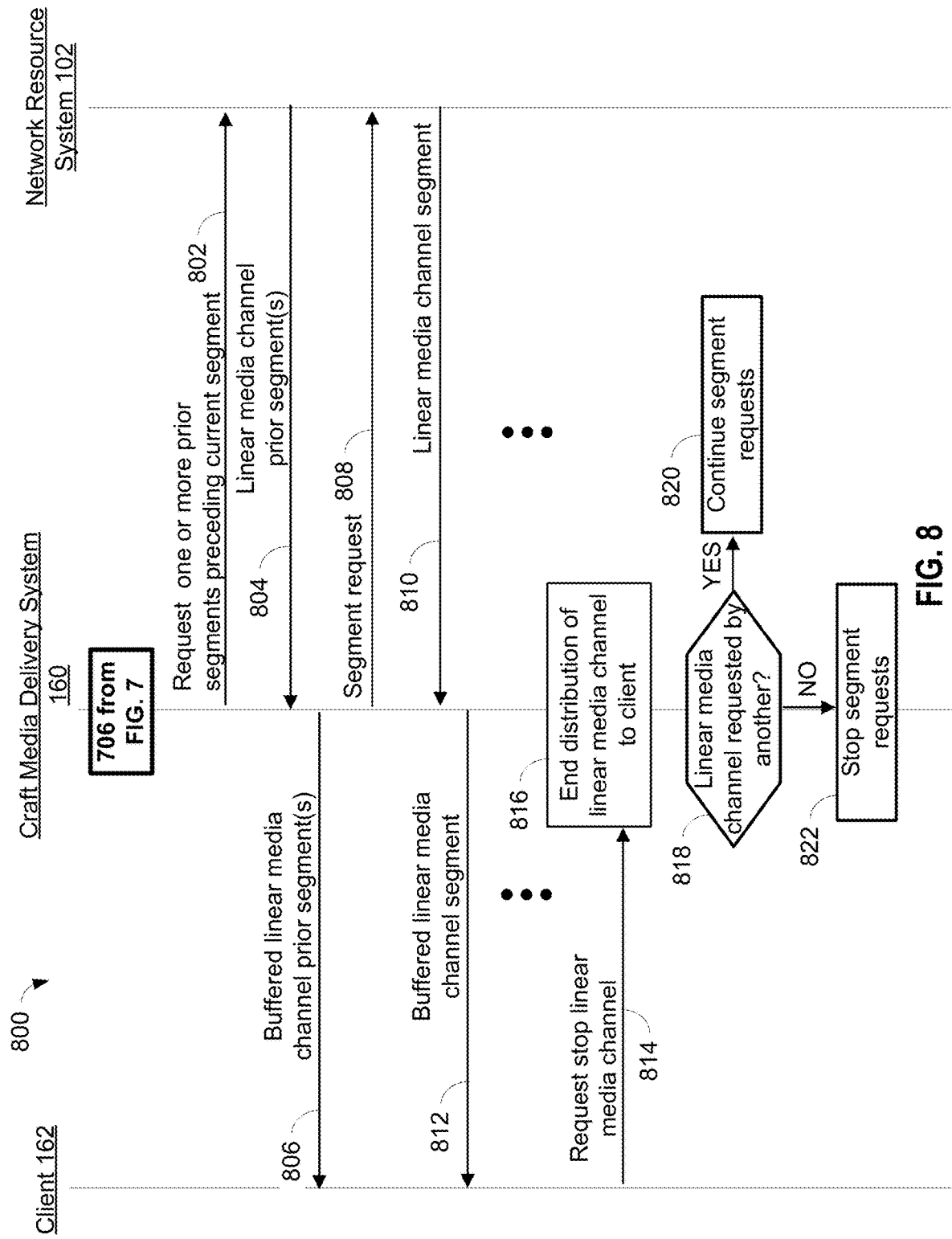
FIG. 8 depicts another call flow diagram continuing a portion of the request process for linear media channel data described in connection with FIG. 7, in accordance with some embodiments.

FIG. 8 depicts another call flow diagram 800 continuing a portion of the process for requesting linear media channel data described in connection with FIG. 7, in accordance with some embodiments. Thus, call flow diagram 800 similarly shows client 162, craft media delivery system 160, and network resource system 102.

Call flow diagram 800 begins with step 706 from FIG. 7. Call flow diagram 800 shows craft media delivery system 160 sends a request 802 for one or more prior segments to the preceding current segment of the requested linear media channel to network resource system 102. Requesting and then receiving the one or more prior segments allows craft media delivery system 160 rapidly fills local media buffer 302 so streaming to client 162 can begin as soon as possible. Network resource system 102 then sends the requested prior linear media channel segment(s) 804 to craft media delivery system 160. Since receiving the one or more prior segments allows craft media delivery system 160 to rapidly fill local media buffer 302, the transmission rate (or modified information rate) of these prior segments may be much higher than the playback rate. Craft media delivery system 160 buffers the segment(s) 804 in local media buffer 302 and then sends the buffered prior segments 806 to client 162.

The craft media delivery system 160 can the update the status of the requested linear media channel from an unrequested channel to a requested linear media channel within the group of linear media channels requested by the craft 150, in order to permit subsequent segment requests. Call flow diagram 800 then shows that craft media delivery system 160 sends a request 808 for at least one following segment of the requested linear media channel to network resource system 102. In response, network resource system 102 sends the requested segment(s) 810 of the requested linear media channel to craft media delivery system 160. Upon receipt, craft media delivery system 160 buffers the requested segment(s) 810 and sends the buffered linear media channel segment(s) 812 to client 162.

As indicated by the six dots, the process of craft media delivery system 160 sending request 808, network resource system 102 sending the requested segment(s) 810, and craft media delivery system 160 sending the buffered linear media channel segment(s) 812 to client 162 may be repeated as long as the client 162 is still requesting the linear media channel.

At some time, client 162 may send a request 814 to stop receiving the requested linear media channel. At step 816 craft media delivery system 160 ends distribution of the requested linear media channel to client 162. Call flow diagram 800 then advances to step 818 where a determination is made as to whether the linear media channel is still being requested by another client on craft 150.

If the determination at step 818 is YES (i.e., the linear media channel is still being requested by another client on craft 150), call flow diagram 800 advances to step 820 where segment request and receipt are continued, as previously described for request 808 and receipt of segment 810. In other words, subsequent segment requests for the linear media channel are permitted.

If the determination at step 818 is NO (i.e., the linear media channel is not still being requested by another client on craft 150), call flow diagram 800 advances to step 822, which includes terminating segment requests for the linear media channel, since that linear media channel is no longer being requested by any client devices on craft 150. In other words, subsequent segment request for the linear media channel are precluded.

From time to time segments of linear media channel data may be received with an error. Thus, it is desirable that a correction process be implemented whereby data received in error may be re-requested and received without error.

Figure 9:
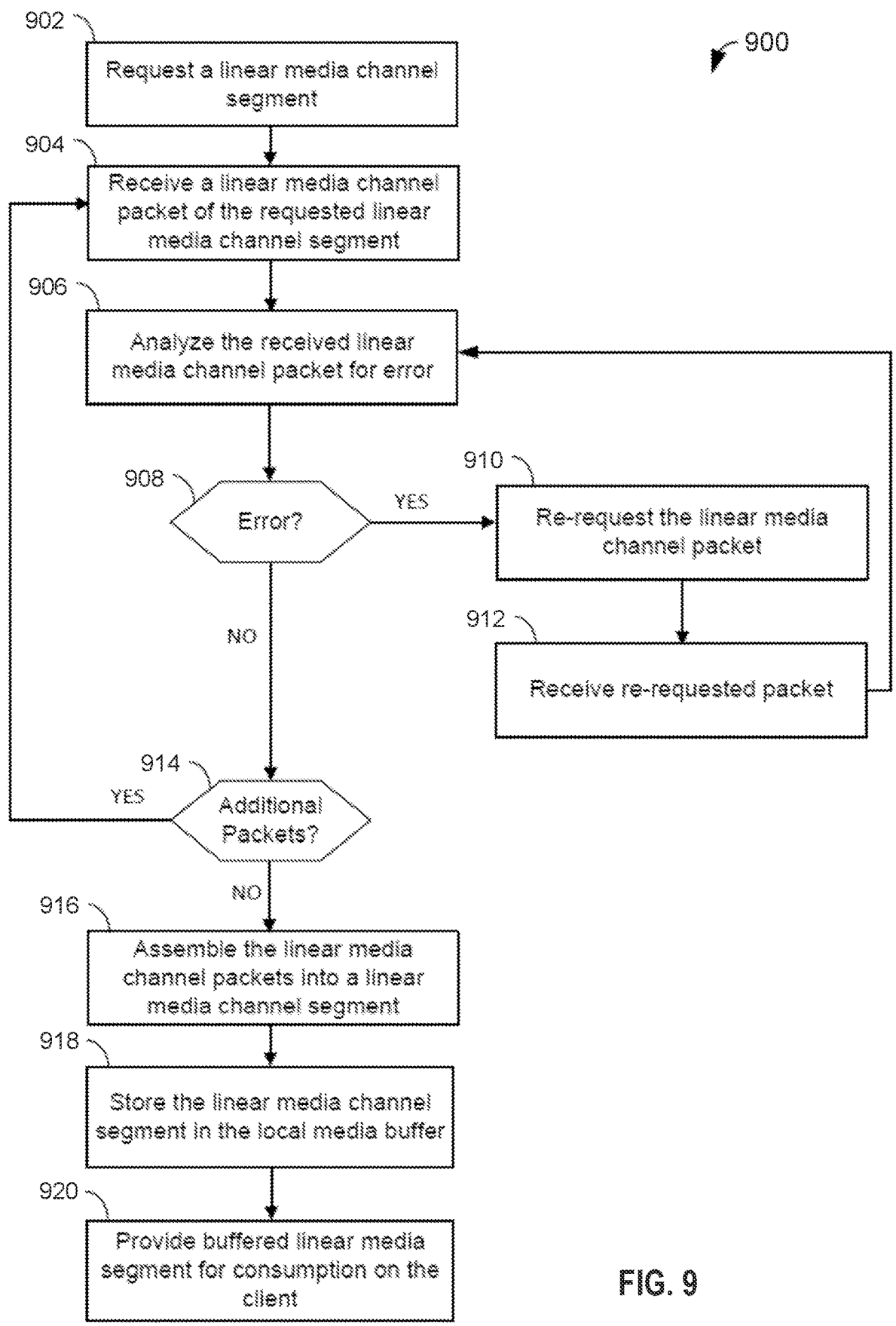
FIG. 9 depicts a flow chart of a correction process performed for data received by the craft media delivery system described in connection with FIGS. 1 and 3, in accordance with some embodiments.

FIG. 9 depicts a flow chart 900 of a correction process performed for data received by craft media delivery system 160 described in connection with FIGS. 1 and 3, in accordance with some embodiments. The correction process of the flow chart 900 may for example be performed by the communication controller 304 of the craft media delivery system 160. Alternatively, the correction process may be performed by the network access unit 158 or other component on the craft 150.

Flow chart 900 includes step 902, which includes requesting at least one linear media channel segment. For example, craft media delivery system 160 may send a request for at least one linear media channel segment(s) to network resource system 102 (see FIG. 1).

Flow chart 900 advances to step 904, which includes receiving at least one linear media channel packet of a requested linear media channel segment. For example, craft media delivery system 160 may receive at least one linear media channel packet from network resource system 102 (see FIG. 1).

Flow chart 900 advances to step 906, which includes analyzing the received linear media channel packet for errors. For example, craft media delivery system 160 may accomplish such an error check through either positive or negative logic. That is, the network resource system may expect acknowledgement of receipt of individual packets, and retransmit those packets that are not acknowledged. Alternatively, the network resource system may only retransmit packets upon receipt of an explicit "non-acknowledgement" indication from the craft media delivery system, that is, an explicit message from the craft indicating a packet was not received. In the latter case, the craft may have a priori knowledge or expectation of what was supposed to received, e.g., via a high level bit map.

Flow chart 900 advances to step 908, where a determination is made whether the received media channel packet included any error. If the determination at step 908 is YES (i.e., an error was determined), flow chart 900 advances to step 910, which includes re-requesting the linear media channel packet. For example, craft media delivery system 160 may re-request the packet determined to have an error from network resource system 102. In alternative embodiments, rather than re-requesting the packet having the error, the entire segment may be re-requested. Flowchart 900 advances to step 912, which includes receiving the re-requested packet. For example, craft media delivery system 160 may receive the re-requested packet from network resource system 102. Flowchart 900 may then advance back to step 906.

Returning to step 908, if the determination at step 908 is NO (i.e., no error is determined in the received linear media channel packet), flow chart 900 may advance from step 908 to step 914, which includes determining whether there are additional packets to be received for the requested linear media channel segment. For example, craft media delivery system 160 may be configured to make such a determination. If the determination at step 914 is YES (i.e., there are additional packets to be received for the requested linear media channel segment), flow chart 900 advances back to step 904.

If the determination at step 914 is NO (i.e., there are no additional packets to be received for the requested linear media channel segment), flow chart 900 advances to step 916, which includes assembling the linear media channel packets into a linear media channel segment. For example, craft media delivery system 160 may be configured to perform such assembling. The assembling may be based on information in the packets, such as one or more of information identifying the linear media channel (e.g., channel ID), information identifying the segment (e.g., segment ID), and/or sequence numbers of each packet within the segment.

Flow chart 900 advances to step 918, which includes storing the linear media channel segment in local media buffer 302. Flow chart 900 advances to step 920, which includes providing the buffered linear media segment for consumption by the client. For example, craft media delivery system 160 may be configured to send the buffered linear media segment to client devices 162 for consumption (e.g., for display for a user of client devices 162).

Figure 10:
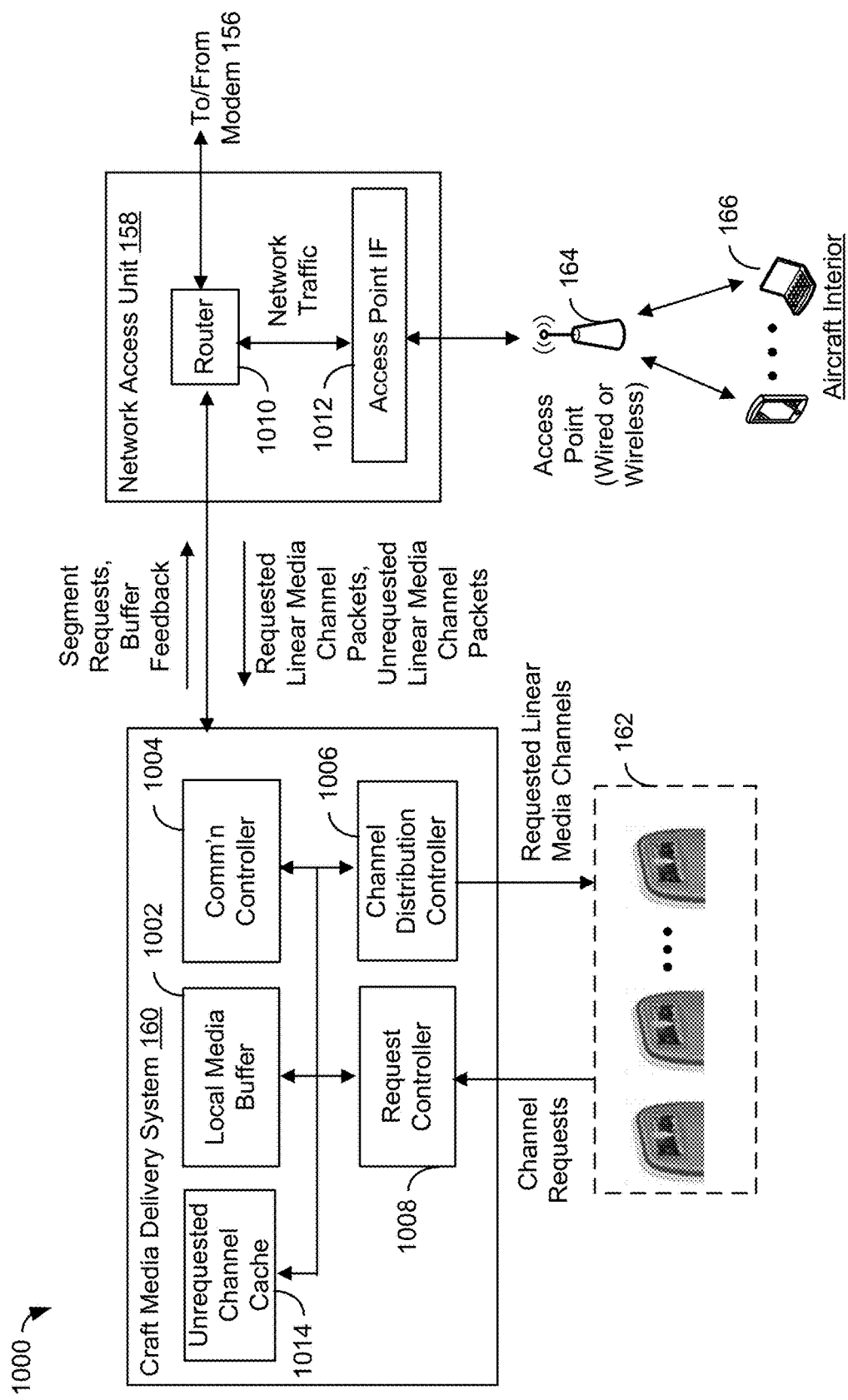
FIG. 10 depicts another simplified diagram of the craft media delivery system and network access unit described in connection with FIG. 1, in accordance with some embodiments.

FIG. 10 depicts another simplified diagram 1000 of craft media delivery system 160 and network access unit 158 described in connection with FIG. 1, in accordance with some embodiments. Many other configurations are possible having more or fewer components. Moreover, the functionalities described herein can be distributed among the components in a different manner than described herein. FIG. 10 further shows client devices 162 and wireless access point 164 as previously described in connection with FIG. 1. In some embodiments, components having the same numerals as in FIG. 3, except beginning with a "10" rather than a "3", may correspond to substantially the same components.

As shown in FIG. 10, craft media delivery system 160 comprises a local media buffer 1002, an unrequested channel cache 1014, a communication controller 1004, a request controller 1006, and a channel distribution controller 1008, each in communication with one another.

Request controller 1006 may be configured to receive linear media channel requests from one or more client devices 162 and provide indications of these requests to at least one of channel distribution controller 1008, and communication controller 1004.

Communication controller 1004 may be configured to provide linear media channel data segment requests and/or buffer feedback associated with the amount of data buffered in local media buffer 1002 to network access unit 158, to receive requested linear media channel packets from network access unit 158, and/or to receive unrequested linear media channel packets from network access unit 158.

As previously described in connection with FIG. 2, local media buffer 1002 may be configured to buffer requested linear media channel data received from network resource system 102 and provide that data to channel distribution controller 1008.

Unrequested channel cache 1014 may be configured to cache unrequested linear media channel data received from network resource system 102 and provide that data to channel distribution controller 1008 upon request. As will be described in more detail below, in addition to functionality already described, in some embodiments in which the streaming linear media channels may be multicast, craft 150 may receive channels that are not currently being requested by users on the craft 150. The communication controller 1004 may thus receive, from the network access unit 158, linear media channel packets for requested linear media channel(s) and/or unrequested linear media channel(s). The communication controller 1004 may split the received linear media channel packets into "requested" linear media channel packets of the requested linear media channel(s), and "unrequested" linear media channel packets of the "unrequested" linear media channel(s). The communication controller 1004 may then perform a correction process on the requested linear media channel packets (e.g., the correction process of FIG. 9) and assemble the corrected packets into channel segments for storage within local media buffer 1002. However, for the unrequested linear media channel packets, the communication controller 1004 may be configured to not send requests for missing or corrupted portions of such unrequested linear media channel data in order to avoid retransmission of data that may never be requested. The communication controller 1004 may store such "uncorrected" unrequested linear media channel packets within the unrequested channel cache. If a user of a client on craft 150 subsequently requests a currently unrequested linear media channel that is presently being received and stored by unrequested channel cache 1014, craft media delivery system 160 may request retransmission of just the missing or corrupted portions, if any, without requiring retransmission of all linear media channel data for the previously unrequested linear media channel that would otherwise be required to fill unrequested channel cache 1014.

In this way, unrequested linear media channel data may be cached in unrequested channel cache 1014 such that upon subsequent request of that currently unrequested linear media channel data, a "channel-change" delay associated with a new request and buffering of the newly-requested linear media channel data may be reduced or eliminated. In addition, caching the unrequested channel data improves efficiency of feeder communication link 112 and service communication link 114 by avoiding retransmission of the linear media channel data that was already transmitted based on another craft's request. In embodiments in which the channels are viewed by passengers via client devices 162 (e.g., a seatback, in-flight entertainment system), the media may immediately or substantially immediately begin streaming to client devices 162. The communication controller 1004 may use information (e.g., a time-to-live) within each unrequested linear media channel packet to determine when to flush each unrequested linear media channel packet from cache, so that the unrequested channel cache 1014 does not store "old" segments of the unrequested linear media channel(s).

Channel distribution controller 1008 may be configured to provide the linear media channel data for requested and/or unrequested linear media channels to the appropriate requesting client devices 162 from local media buffer 1002.

Network access unit 158 comprises a router 1010 and an access point interface 1012. Router 1010 is configured to receive the linear media channel data segment requests and buffer feedback from craft media delivery system 160 and provide them to modem 156 (see FIG. 1). Router 1010 is further configured to receive requested and/or unrequested linear media channel packets from modem 156 and provide them to craft media delivery system 160. Router 1010 is further configured to provide requested and/or network traffic data between access point interface 1012 and modem 156. Access point interface 1012 is configured to provide a communication interface between router 1010 and wireless access point 164.

Figure 11:
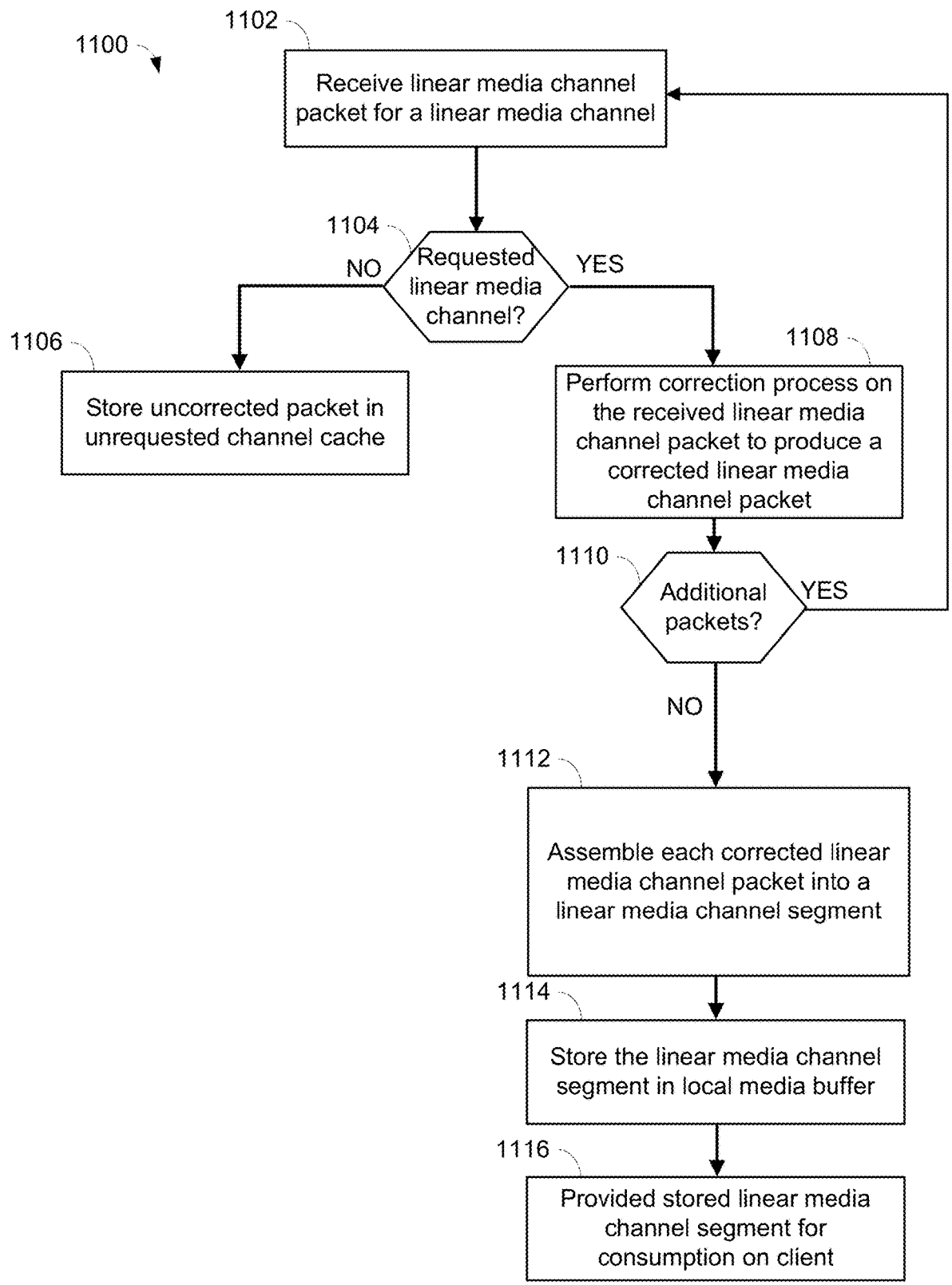
FIG. 11 depicts a flow chart of another correction process performed for data received by the craft media delivery system described in connection with FIGS. 1 and 10, in accordance with some embodiments.

FIG. 11 depicts a flow chart 1100 of another correction process performed for data received by craft media delivery system 160 described in connection with FIGS. 1 and 10, in accordance with some embodiments. The correction process of flow chart 1100 may for example be performed by communication controller 1004 of FIG. 10.

Flow chart 1100 includes step 1102, which includes receiving at least one linear media channel packet for a linear media channel. For example, craft media delivery system 160 may receive at least one linear media channel packet from network resource system 102 via network access unit 158.

Flow chart 1100 advances to step 1104, where a determination is made as to whether the received linear media channel packet is associated with (or for) a requested linear media channel. If the determination at step 1104 is NO (i.e., the received linear media channel packet is not associated with a requested linear media channel), flow chart 1100 advances to step 1106, which includes storing, uncorrected, the linear media channel packet in unrequested channel cache 1014. In some embodiments, the received linear media channel packet is stored in the unrequested channel cache 1014 without checking for errors. In other embodiments, the received linear media channel packet is checked for errors before storing in the unrequested channel cache 1014. In such a case, the craft media delivery system 160 may prepare the re-requests (if any) for received linear media channel packets in the unrequested channel cache 1014 that have errors, but not send the re-requests until the unrequested linear media channel is subsequently requested by a client device 162 on the craft 150.

If the determination at step 1104 is YES (i.e., the received linear media channel packet is associated with (or for) a requested linear media channel), flow chart 1100 advances to step 1108, which includes performing a correction process on the received linear media channel packet to produce a corrected linear media channel packet. Such a correction process may comprise, for example, the correction process previously described in connection with at least steps 906, 908, 910 and 912 of flow chart 900 in FIG. 9.

Flow chart 1100 may then advance from step 1108 to step 1110, which includes determining whether there are additional packets to be received for the requested linear media channel. For example, craft media delivery system 160 may be configured to make such a determination. If the determination at step 1110 is YES (i.e., there are additional packets to be received for the requested linear media channel), flow chart 1100 advances back to step 1102.

If the determination at step 1110 is NO (i.e., there are no additional packets to be received for the requested linear media channel), flow chart 1100 advances to step 1112, which includes assembling each corrected linear media channel packet of the plurality of plurality of linear media channel packets into a linear media channel segment. For example, craft media delivery system 160 may be configured to perform such assembling.

Flow chart 1100 advances to step 1114, which includes storing the linear media channel segment in local media buffer 302. Flow chart 1100 advances to step 1116, which includes providing the stored (i.e., buffered) linear media segment for consumption by the client. For example, craft media delivery system 160 may be configured to send the buffered linear media segment to client devices 162 for consumption (e.g., for display for a user of client devices 162).

Figure 12:
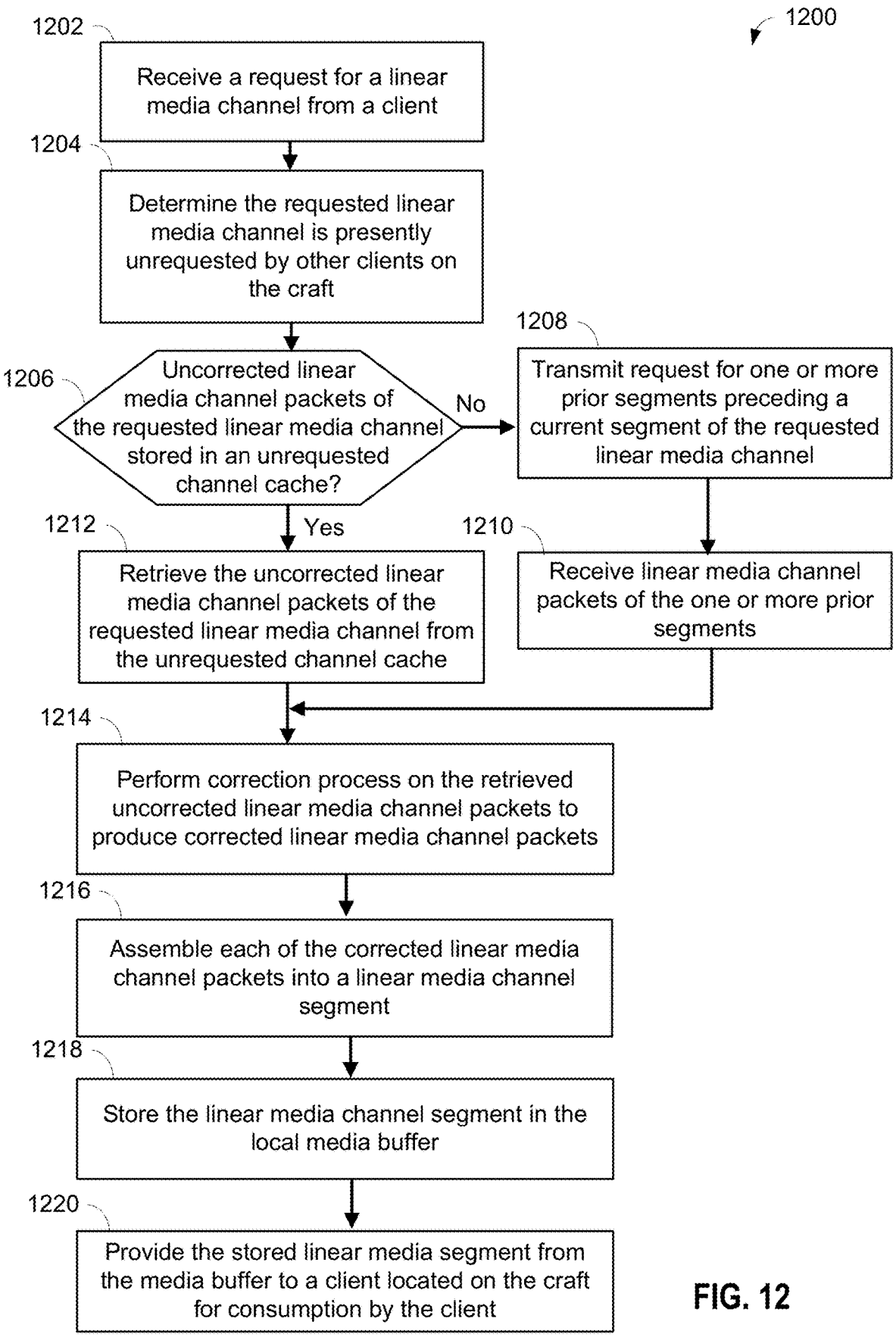
FIG. 12 depicts a flow chart of a request-handling process performed by the craft media delivery system described in connection with FIGS. 1 and 10, in accordance with some embodiments.

FIG. 12 depicts a flow chart 1200 of a request-handling process performed by craft media delivery system 160 as described in connection with FIGS. 1 and 10, in accordance with some embodiments.

Flow chart 1200 includes step 1202, which includes receiving a request for a linear media channel from a client located on a craft. For example, craft media delivery system 160 may receive a request for a linear media channel from client 162.

Flow chart 1200 advances to step 1204, which includes determining whether the requested linear media channel is presently unrequested by any other client on the craft. For example, craft media delivery system 160 may determine that the requested linear media channel is presently unrequested by any other client 162 on craft 150.

Flow chart 1200 advances to step 1206, where a determination is made whether uncorrected packets of the requested linear media channel are stored in an unrequested channel cache. For example, craft media delivery system 160 may determine whether uncorrected packets of the requested linear media channel are stored in unrequested channel cache 1014.

If the determination at step 1206 is NO (i.e., uncorrected packets of the requested linear media channel are not stored in the cache), flow chart 1200 advances from step 1206 to step 1208, which includes transmitting a request for one or more prior segments preceding the current segment of the requested linear media channel. For example, craft media delivery system 160 may transmit a request for one or more prior segments preceding the current segment of the requested linear media channel.

Flow chart 1200 advances from step 1208 to step 1210, which includes receiving linear media channel packets of the one or more prior segments via a communication link. For example, craft media delivery system 160 may receive packets of the one or more prior segments from resource network system 102 (see FIG. 1) via feeder communication link 112 and service communication link 114. Flow chart 1200 advances to step 1214.

Returning to step 1206, if the determination at step 1206 is YES (i.e., uncorrected packets of the requested linear media channel are stored in the cache), flow chart 1200 advances from step 1206 to step 1212, which includes retrieving the uncorrected linear media channel packets of the requested linear media channel from the cache. For example, craft media delivery system 160 may retrieve the uncorrected packets of the requested linear media channel from unrequested channel cache 1014.

Flow chart 1200 then advances to step 1214, which includes performing a correction process on the retrieved uncorrected linear media channel packets to produce corrected linear media channel packets. For example, craft media delivery system 160 may perform such a correction process. Such a correction process may comprise, for example, the correction process previously described in connection with at least steps 904, 906, 908, 910, 912, and 914 of flow chart 900 in FIG. 9.

Flow chart 1200 advances to step 1216, which includes assembling each of the corrected linear media channel packets into a linear media channel segment. For example, craft media delivery system 160 may be configured to perform such assembling.

Flow chart 1200 advances to step 1218, which includes storing the linear media channel segment in local media buffer 302. Flow chart 1200 advances to step 1220, which includes providing the stored linear media segment from the media buffer to a client located on the craft for consumption by the client. For example, craft media delivery system 160 may be configured to send the buffered linear media segment to client devices 162 for consumption (e.g., for display for a user of client devices 162). The craft media delivery system 160 may also change the status of the requested linear media channel from an unrequested channel to a requested linear media channel within the group of linear media channels requested by the craft 150, in order to permit subsequent segment requests.

In some embodiments, network resource system 102 may use adaptive coding and modulation to communicate requested streaming linear media channels to craft 150. For example, network resource system 102 may select a modcode point for a requested streaming linear media channel such that the group of craft(s) that have requested the linear media channel can reliably receive the content based on the estimated or monitored condition of one or both of communication links 112, and 114 with the respective crafts, without consideration as to (i.e., independent of) whether other craft that have not requested the linear media channel can reliably receive it. As another example, network resource system 102 may select a modcode point sufficient to be reliably received by each craft that has requested the linear media channel and each craft that has not requested the linear media channel.

Figure 13:
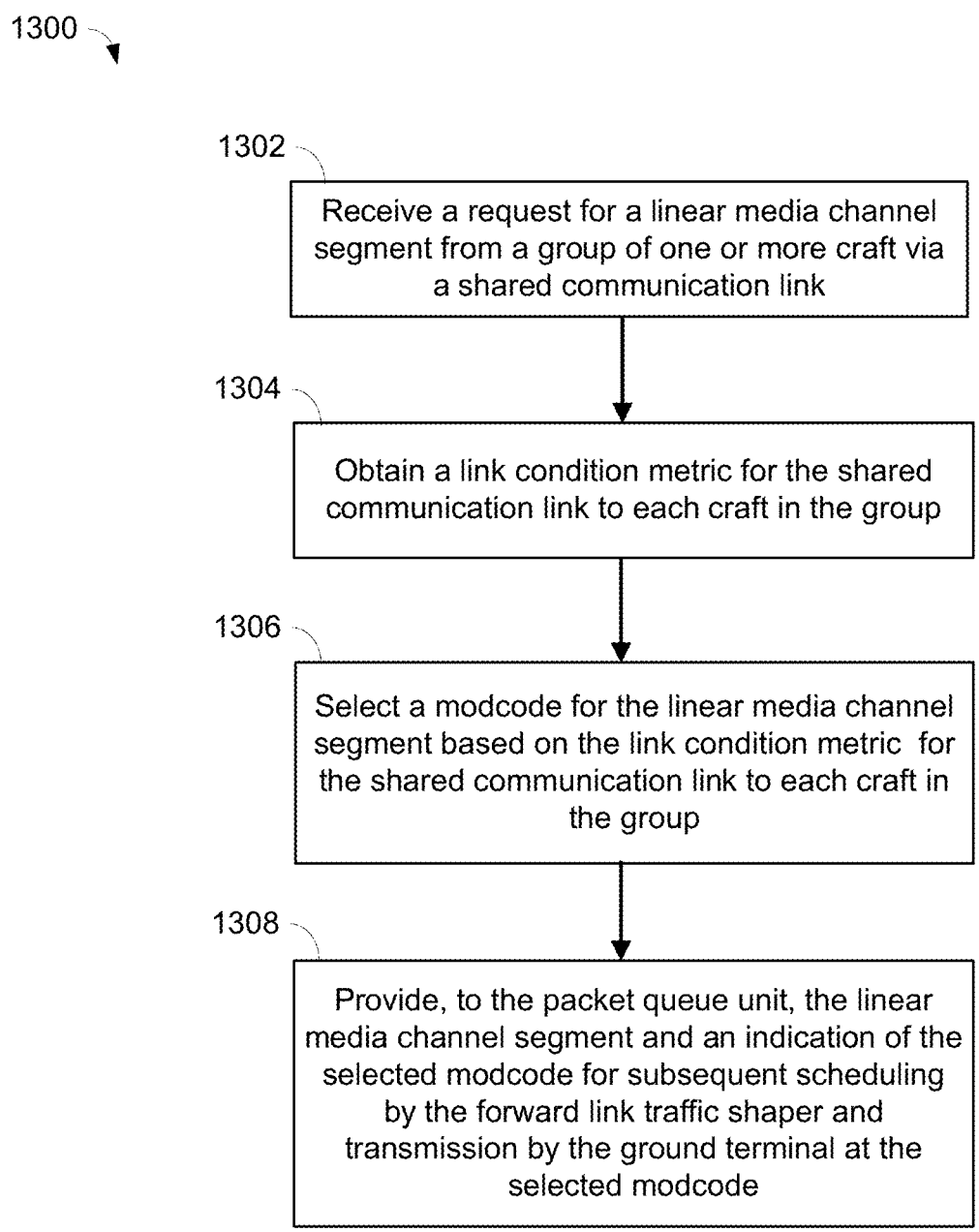
FIG. 13 depicts a flow chart of an adaptive modcode process performed by the linear media distribution system described in connection with FIG. 1, in accordance with some embodiments.

FIG. 13 depicts a flow chart 1300 of an adaptive modcode process performed by the linear media distribution system 206 of network resource system 102 described in connection with FIG. 2, in accordance with some embodiments.

Flow chart 1300 includes step 1302, which includes receiving a request for a linear media channel segment from a group of one or more crafts via a shared communication link. For example, network resource system 102 may receive a request for a linear media channel segment from one or more craft 150 via one or both of communication links 112 and 114. If more than one craft is located within a service area of one or both of communication links 112 and 114, those crafts may share the communication links 112 and 114.

Flow chart 1300 advances from step 1302 to step 1304, which includes obtaining a link condition metric from the shared communication link to each craft in the group. For example, network resource system 102 may obtain a link condition metric from one or both of feeder communication link 112 and service communication link 114 to each craft in the group that shares one or both of communication links 112 and 114. Such a link condition metric may comprise a signal-to-noise ratio, a packet error rate, or any other metric indicative of any condition of the link(s) pertinent to the ability to transmit and/or receive data over the link(s). Such link condition metrics may be measured or estimated by network resource system 102, and/or may be based on feedback from craft media delivery system 160.

Flow chart 1300 advances from step 1304 to step 1306, which includes selecting a modcode for the linear media channel segment based at least in part on the link condition metric for the shared communication link to each craft in the group. For example, network resource system 102 may select a modcode for the linear media channel segment based at least in part on the link condition metric of each craft in the group, as previously described. The modcode may be selected such that each craft in the group that has requested the segment can reliably receive it, without consideration as to whether other craft or other terminals sharing the link 114 can reliably receive it. In other words, the modcode may be selected based on the craft in the group that has the poorest link quality metric (e.g., based on a lowest link condition metric from among the link condition metric for the communication link to each craft in the group). Although the poorest (i.e., lowest) link quality metric among the craft in the group, it may be better than that of other craft or other terminals sharing service communication link 114. As a result, this may improve resource efficiency of service communication link 114 by increasing the allowable coding rate (e.g., decreasing data redundancy) for transmitting the requested segment, as compared to selecting a modcode sufficient for anyone using service communication link 114 including non-requesting terminals to receive it. In some embodiments, selecting the modcode for the linear media channel segment is independent of other crafts communication via the communication link that have not requested the linear media channel segment.

Flow chart 1300 advances from step 1306 to step 1308, which includes providing, to the packet queue unit, the linear media channel segment and an indication of the selected modcode for subsequent scheduling by the forward link traffic shaper and transmission by the ground terminal at the selected modcode. For example, network resource system 102 may provide, to packet queue unit 208, the linear media channel segment and data indicating the selected modcode for subsequent scheduling by forward link traffic shaper 216 and transmission by ground terminal 110 at the selected modcode. In the illustrated embodiment, a single modcode is selected for the linear media channel segment. In other embodiments, the selection may occur at the packet or sub-packet level. In such a case, the selected modcode may be different for different packets (or sub-packets) of the linear media channel segment, for example due to changes in the link quality metric during the length of the segment.

The methods disclosed herein include one or more actions for achieving the described method. The methods and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In the present disclosure, certain terminology is used in the following ways. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method comprising:
receiving respective requests for a linear media channel segment associated with a linear media channel from a plurality of crafts via a communication link that is shared for the plurality of crafts;
obtaining a link condition metric for the shared communication link to each craft of the plurality of crafts;
selecting a modcode for the linear media channel segment based on the link condition metric for the shared communication link to each of the plurality of crafts; and
providing an indication of the selected modcode for subsequent scheduling and transmission of the linear media channel segment.

2. The method of claim 1, further comprising:
transmitting the linear media channel segment via the shared communication link in accordance with the selected modcode.

3. The method of claim 1, wherein obtaining the link condition metric further comprises:
obtaining the link condition metric for both a feeder communication link and a service communication link associated with the shared communication link.

4. The method of claim 3, wherein obtaining the link condition metric further comprises:
receiving the link condition metric from a craft of the plurality of crafts.

5. The method of claim 3, wherein the link condition metric comprises a signal-to-noise ratio, a packet error rate, or a combination thereof.

6. The method of claim 1, wherein selecting the modcode further comprises:
determining a lowest link condition metric for the shared communication link associated with a craft of the plurality of crafts, wherein the selected modcode is based at least in part on the lowest link condition metric.

7. The method of claim 1, wherein the plurality of crafts is a first plurality of crafts and the shared communication link is shared by the first plurality of crafts and a second plurality of crafts that have not requested the linear media channel segment, and wherein selecting the modcode is independent of link condition metrics of the second plurality of crafts.

8. The method of claim 7, wherein a lowest link condition metric for the plurality of crafts is greater than a lowest link condition metric for the second plurality of crafts.

9. The method of claim 1, wherein the selected modcode for a first packet of the linear media channel segment is different from the selected modcode for a second packet of the linear media channel segment.

10. The method of claim 9, wherein a first link quality metric associated with the first packet is different from a second link quality metric associated with the second packet, and wherein the selected modcode for the first packet is based at least in part on the first link quality metric and the selected modcode for the second packet is based at least in part on the second link quality metric.

11. The method of claim 1, wherein the selected modcode is the same for each packet of the linear media channel segment.

12. The method of claim 1, wherein the plurality of crafts are within a service area of the shared communication link.

13. The method of claim 1, further comprising:
transmitting, with the linear media channel segment, the indication of the selected modcode.

14. A system for providing communications via a communication link that is shared for a plurality of crafts, comprising:
a linear media distribution system configured to:
receive respective requests for a linear media channel segment associated with a linear media channel from the plurality of crafts via the shared communication link;
obtain a link condition metric for the shared communication link to each craft of the plurality of crafts;
select a modcode for the linear media channel segment based on the link condition metric for the shared communication link to each of the plurality of crafts; and
provide an indication of the selected modcode for subsequent scheduling and transmission of the linear media channel segment.

15. The system of claim 14, further comprising:
a ground terminal configured to transmit the linear media channel segment via the shared communication link in accordance with the selected modcode.

16. The system of claim 14, wherein the linear media distribution system is further configured to:
obtain the link condition metric for both a feeder communication link and a service communication link associated with the shared communication link.

17. The system of claim 16, wherein the linear media distribution system is further configured to:
receive the link condition metric from a craft of the plurality of crafts.

18. The system of claim 16, wherein the link condition metric comprises a signal-to-noise ratio, a packet error rate, or a combination thereof.

19. The system of claim 14, wherein the linear media distribution system is further configured to:
determine a lowest link condition metric for the shared communication link associated with a craft of the plurality of crafts, wherein the selected modcode is based at least in part on the lowest link condition metric.

20. The system of claim 14, wherein the plurality of crafts is a first plurality of crafts and the shared communication link is shared by the first plurality of crafts and a second plurality of crafts that have not requested the linear media channel segment, and wherein selecting the modcode is independent of link condition metrics of the second plurality of crafts.

21. The system of claim 20, wherein a lowest link condition metric for the plurality of crafts is greater than a lowest link condition metric for the second plurality of crafts.

22. The system of claim 14, wherein the selected modcode for a first packet of the linear media channel segment is different from the selected modcode for a second packet of the linear media channel segment.

23. The system of claim 22, wherein a first link quality metric associated with the first packet is different from a second link quality metric associated with the second packet, and wherein the selected modcode for the first packet is based at least in part on the first link quality metric and the selected modcode for the second packet is based at least in part on the second link quality metric.

24. The system of claim 14, wherein the selected modcode is the same for each packet of the linear media channel segment.

25. The system of claim 14, wherein the plurality of crafts are within a service area of the shared communication link.

26. The system of claim 14, wherein the linear media distribution system is further configured to:
provide, with the linear media channel segment, the indication of the selected modcode.

\* \* \* \* \*